United States Patent [19]
Ishida et al.

[11] Patent Number: 6,157,608
[45] Date of Patent: Dec. 5, 2000

[54] OPTICAL DISC, OPTICAL DISC DEVICE, AND METHOD FOR RECORDING AN OPTICAL DISC

[75] Inventors: Takashi Ishida, Yawata; Shinji Kubota, Daito; Mamoru Shoji, Sakai; Shinji Ishida, Akashi, all of Japan

[73] Assignee: Matsushita Electric Industrial Co., Ltd., Japan

[21] Appl. No.: 09/396,440

[22] Filed: Sep. 15, 1999

Related U.S. Application Data

[63] Continuation of application No. 08/946,576, Oct. 7, 1997, Pat. No. 6,034,932.

[30] Foreign Application Priority Data

| Oct. 7, 1996 | [JP] | Japan | 8-265876 |
| Oct. 11, 1996 | [JP] | Japan | 8-269580 |

[51] Int. Cl.⁷ ................................ G11B 7/00
[52] U.S. Cl. .................. 369/275.3; 369/47; 369/48; 369/59
[58] Field of Search .................. 369/275.3, 47, 369/48, 54, 58, 59

[56] References Cited

U.S. PATENT DOCUMENTS

| 5,216,657 | 6/1993 | Nishiuchi et al. . |
| 5,343,455 | 8/1994 | Takeuchi et al. . |
| 5,388,105 | 2/1995 | Takagi et al. . |
| 5,528,569 | 6/1996 | Fujiie et al. . |
| 5,878,021 | 3/1999 | Miyauchi et al. . |

FOREIGN PATENT DOCUMENTS

| 05266490 | 10/1993 | European Pat. Off. . |
| 0 674 314 A1 | 9/1995 | European Pat. Off. . |
| 0 718 831 A1 | 6/1996 | European Pat. Off. . |
| 0 718 831 A2 | 6/1996 | European Pat. Off. . |
| 0 718 831 A3 | 5/1997 | European Pat. Off. . |
| 0 814 463 A2 | 12/1997 | European Pat. Off. . |
| 2904360 | 8/1992 | Japan . |
| 5-242543 | 9/1993 | Japan . |
| 8-7276 | 1/1996 | Japan . |
| 9-35276 | 2/1997 | Japan . |
| 328585 | 1/1998 | Taiwan . |

*Primary Examiner*—Nabil Hindi
*Attorney, Agent, or Firm*—Parkhurst & Wendel, L.L.P.

[57] ABSTRACT

In an optical disc, a sector is sequentially formed with a first gap field, a first guard data recording field, a data recording field composed of synchronous signal and user data, a second guard data recording field, and a second gap field, wherein the length of the first and second gap fields, and the length of the first and second guard data recording fields is changed randomly in every recording, and the changing amount of the first and second guard data recording fields is set smaller than the changing amount of the first and second guard data recording fields, thereby suppressing optical disc medium deterioration in every sector and every mark resulting from repeated recording.

3 Claims, 19 Drawing Sheets

1 time of repetition

Period interval by 1 time of repetition 100,000 times of repetition

Period interval by 100,000 times of repetition

FIG. 5a Initial time of repetition
FIG. 5b Period interval by 1 time of repetition
FIG. 5c 100,000 times of repetition
FIG. 5d Period interval by 100,000 times of repetition
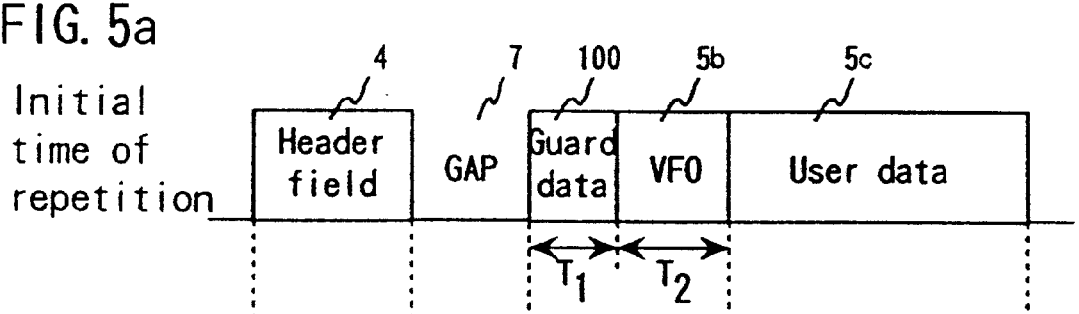
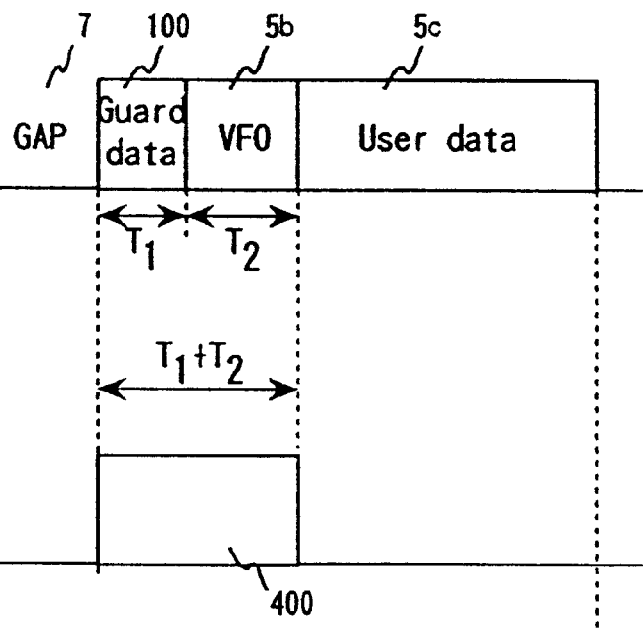
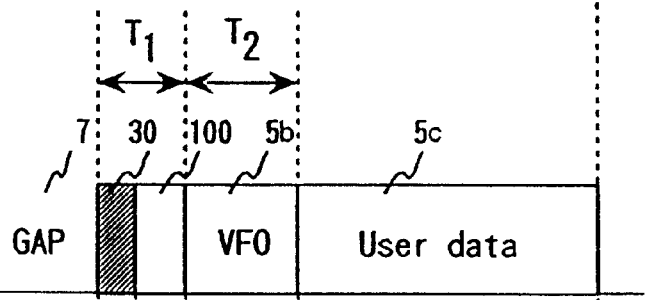
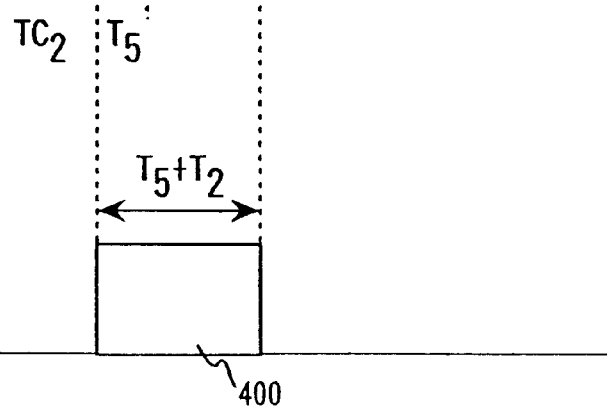

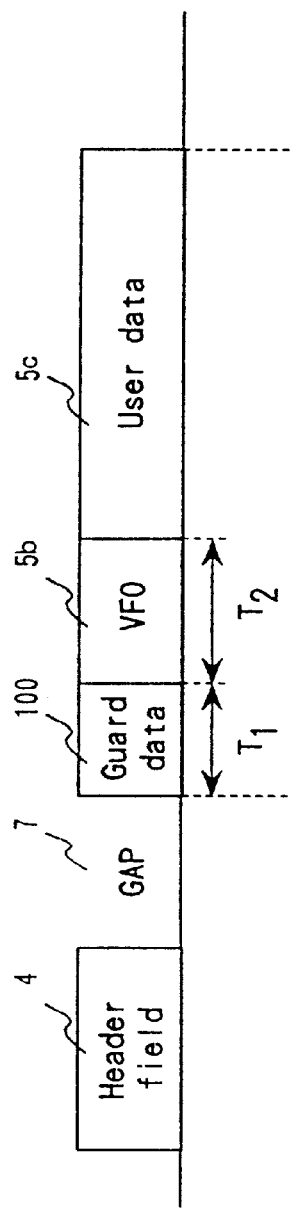
FIG. 8a Sector 1
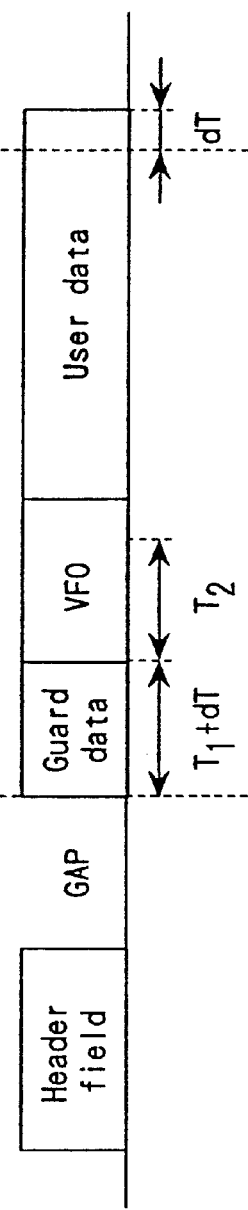
FIG. 8b Sector 2
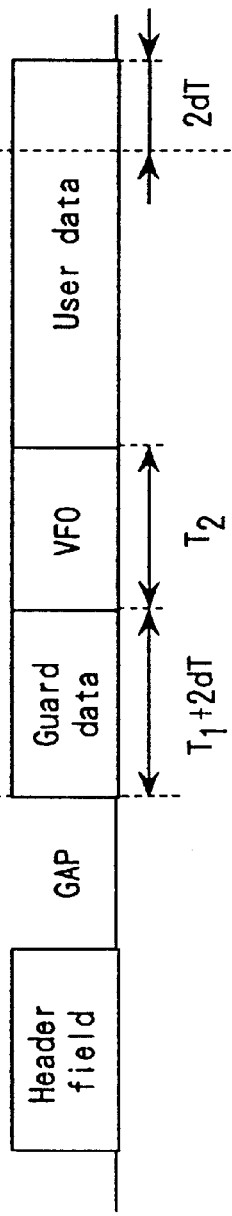
FIG. 8c Sector 3
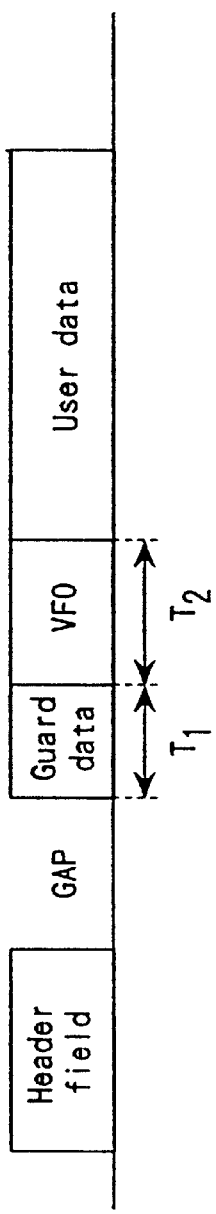
FIG. 8d Sector 4

OPTICAL DISC, OPTICAL DISC DEVICE, AND METHOD FOR RECORDING AN OPTICAL DISC

This is a Continuation of application Ser. No. 08/946,576 filed Oct. 7, 1997 now U.S. Pat. No. 6,034,932.

FIELD OF THE INVENTION

The present invention relates to an optical disc for recording and reproducing digital signals in a sector unit of an optical disc, an optical disc device, and a recording method for an optical disc.

DESCRIPTION OF THE PRIOR ART

Optical discs are presently widely distributed as read-only recording media for audio and video use, e.g., a compact disc (CD), and as rewritable recording media, e.g., a mini disc (MD). Moreover, as an external memory device for a computer, rewritable 3.5-inch magneto-optical discs and 5-inch phase change optical discs (PD) are becoming popular.

Henceforth, as the recording media for multimedia, digital video disc (DVD) using phase change optical discs is about to be popularly marketed. One of the merits of the phase change optical disc is that to overwrite an information signal, only a single laser beam is necessary as a recording means. That is, when a modulated laser output is emitted onto a recorded information track as a function of an information signal switching between a recording level and an erasing level, a new signal can be recorded while erasing an existing information signal.

A format structure of such an optical disc is explained by referring to FIG. 18. In FIG. 18, reference numeral 1 is an optical disc, 2 represents tracks on the optical disc 1, and 3 designates sectors dividing the tracks into plural fields. Each sector 3 dividing the tracks into plural fields. Each sector 3 is composed of a header field 4 including track and sector address information, a gap field 7 with no signal recorded therein, a data recording field 5 for recording user data, and a buffer field 6 for absorbing the effects of imprecision in rotation of the motor.

The header field 4 is usually formed of prepits, and is not used for recording. Reference numeral 4a is a synchronous signal VFO for synchronizing, 4b is an address mark for detecting the header field by a special recording pattern not appearing on the modulation pattern, 4c is a field containing a physical identification address (PID) having address information with respect to a physical position of the sector, and 4d is an ID error detection (IED) for detecting an address error. The header field composed of blocks 4a to 4d may be composed of plural header fields in order to enhance the reliability thereof.

The data recording field 5 is composed of a synchronous signal VFO 5b for synchronizing and user data 5c.

Referring now to FIG. 19, an optical disc device for recording and reproducing signals by a recordable optical disc is explained. In FIG. 19, reference numeral 1 is an optical disc, 10 is an optical head for recording and reproducing signals on tracks of the optical disc 1, 11 is a servo control circuit for focusing an optical beam of a semiconductor laser on the tracks of the optical disc, 12 is a laser driving circuit for controlling the optical output of the semiconductor laser, 13 is a data modulation circuit for digitally modulating coded data into a form suited to recording, and 14 is a VFO generating circuit for generating VFO as a synchronous signal. Reference numeral 15 is a coding circuit for performing error correction coding on recorded data, 16 is a record control circuit for controlling the timing of recording, 17 is an address detecting circuit for detecting an address signal from a reproduced signal, 18 is a system control circuit for controlling the operation of the entire optical disc device composed of a microprocessor, and other related circuitry, and 19 is data to be recorded.

The data coded in the coding circuit 15 is modulated in the data modulation circuit 13 and is output as modulated data. The synchronous signal VFO generated in the VFO generating circuit 14 is added to the beginning of this modulated data and is delivered to the laser driving circuit 12, and is recorded in the optical disc 1.

In such a rewritable light-operative optical disc, however, the number of recording repetitions is limited, since the recording medium deteriorates due to thermal load, under repeated exposure to light. Generally, such deterioration phenomena tend to be more prevalent in the deterioration area as the number of recording repetitions increases. Deterioration phenomena may be roughly classified into two types as follows:

(1) deterioration phenomenon in each sector, occurring in the beginning end (record start position) of a recording field in the sector and terminating end (record end portion), by repeated recording on the sector, and (2) deterioration phenomenon in each mark, occurring in the mark area, as the mark row of a same pattern is recorded repeatedly in the same position in the sector.

First, in the deterioration phenomenon in each sector, as recording is repeated, deterioration gradually occurs in the recording foil in the beginning end and terminating end of a recording field in the sector, and this defect expands backward of the sector from the beginning end (to the relative laser advancing direction on the optical disc) and forward of the sector from the terminating end (to the reverse direction of the relative laser advancing direction on the optical disc).

The above-described phenomenon is understood to occur because, when the recording foil is in a fused state, a movement phenomenon of the recording foil substance in the track direction occurs. For instance, by the movement of the recording foil substance to the sector forward direction, as fusion and solidification are repeated multiple times, the recording foil substance accumulates in the record start point portion where the thermal load to the recording foil changes suddenly, and the recording foil substance is decreased in thickness at the recording end point portion. As a result, the film thickness becomes uneven between the recording start point and end point, and thermal or optical characteristics deteriorate, the film exfoliates, and/or the quality of reproduced signals deteriorates in the data beginning end or terminating end, thereby impeding correct recording and reproducing of information.

Next, in the deterioration phenomenon in each mark, as the recording is repeated, a defect occurs in the recording foil when recording the same pattern, and this defect expands forward and backward of the mark portion.

That is, when the same data is repeatedly recorded in the same sector, fusion and solidification are repeated multiple times in some areas, while other areas are not fused at all.

Generally, when rewriting the recorded data in an optical disc, the data is rewritten in the sector unit. Therefore, if information is changed in part of a sector, the entire sector is rewritten. In a TOC (Table of Contents) field or a directory field where information corresponding to the table of contents of the recorded information in the disc is recorded, in particular, similar data are often recorded repeatedly, and the rewriting frequency is high. In the ordinary data sector, too, same data is recorded repeatedly in the synchronous signal portion VFO or the like, and the aforementioned kind of deterioration phenomenon occurs in such instances. As a result, the film thickness of the recorded film fluctuates in the boundary region of the portion fused and solidified repeatedly and the portion not fused at all, and thus the thermal and optical characteristics deteriorate, and the quality of reproduced signal in this portion deteriorates, thereby blocking normal recording and reproducing of information.

OBJECT AND SUMMARY OF THE INVENTION

The present invention is directed, in the light of the above described problems, to an optical disc for recording and reproducing data in the unit of sectors. It is an object of the invention to provide an optical disc capable of reducing the deterioration of the recording foil of the optical disc in every sector and every mark derived from repeated recording, simplifying the associated signal processing system, and suppressing effects of deterioration phenomena on accurate recording and reproducing of information, and an optical disc device, and a recording method for an optical disc.

To achieve these and other objects, in a first feature of the optical disc of the invention, a header field including a sector identifying signal, and a data recording field including a synchronous signal are provided in each one of plural sectors dividing the tracks, and a guard data recording field for recording specific guard data is provided between the header field and data recording field.

In a second feature of the optical disc of the invention, the guard data in the guard data recording field is the same as the recording pattern in the synchronous signal field, and the phase of the recording pattern is continuous near the boundary of the guard data recording field and synchronous signal field.

As a result, the guard data recording field can be substantially utilized as the synchronization signal field, and the lock-in range of synchronization can be expanded further than the synchronous signal field, so that the stability of acquisition of synchronism can be improved even in view of medium deterioration due to repeated recording.

In a third feature of the optical disc of the invention, the recording section of the guard data recording field is changed randomly in every recording.

As a result, the guard data recording field for recording identical signal patterns and the mark position recorded on the recording medium by repeated recording is shifted randomly in every recording, so that deterioration of the recording medium can be prevented.

In a fourth feature of the optical disc of the invention, a sector-structure is formed to comprise, sequentially, a first gap field having no signal, a first guard data recording field for recording guard data, a data recording field including synchronous signal and user data, a second guard data recording field, and a second gap field, wherein the total length of the first and second gap fields is constant, the total length of the first and second guard data recording fields is constant, and, in the sector, at the time of recording, the length of the first gap field and the first guard data recording field is changed randomly upon every recording, and the changing amount of the first gap field is set smaller than the changing amount of the first guard data recording field.

Accordingly, since the first and second gap fields and the first and second guard data recording fields change randomly upon every recording, the medium deterioration in every sector and in ever mark due to repeated recording can be suppressed.

In a fifth feature of the optical disc of the invention, in addition to the fourth feature, the resolution of the changing amount of the first gap field is a channel bit unit, and the resolution of the changing amount of the first guard data recording region is a byte unit.

Hence, while maintaining the ease of realization of data processing on the signal processing system, the medium deterioration in every sector and in every mark due to repeated recording can be suppressed.

In a sixth feature of the optical disc of the invention, in addition to the fourth feature, the signal polarity of guard data and data recording field data is changed randomly upon every recording.

As a result, even in a limited random shift amount, the medium deterioration in every sector and in every mark can be suppressed.

The optical disc device of the invention comprises means for recording and reproducing the optical discs as mentioned herein, and is capable of suppressing the medium deterioration in every sector or in every mark due to repeated recording.

The recording method for an optical disc of the invention comprises a method of recording these optical discs, and is hence capable of suppressing the medium deterioration in every sector or in every mark due to repeated recording.

BRIEF DESCRIPTION OF THE DRAWINGS

FIGS. 5a–d show a synchronous signal section of an optical disc in a third embodiment in which guard data in a guard data recording field has the same pattern as the synchronous signal VFO.

FIGS. 8a–d depict the conditions of sectors of an optical disc according to a sixth embodiment for changing randomly the sector recording section upon every recording.

DETAILED DESCRIPTION OF THE INVENTION

Figure 1:
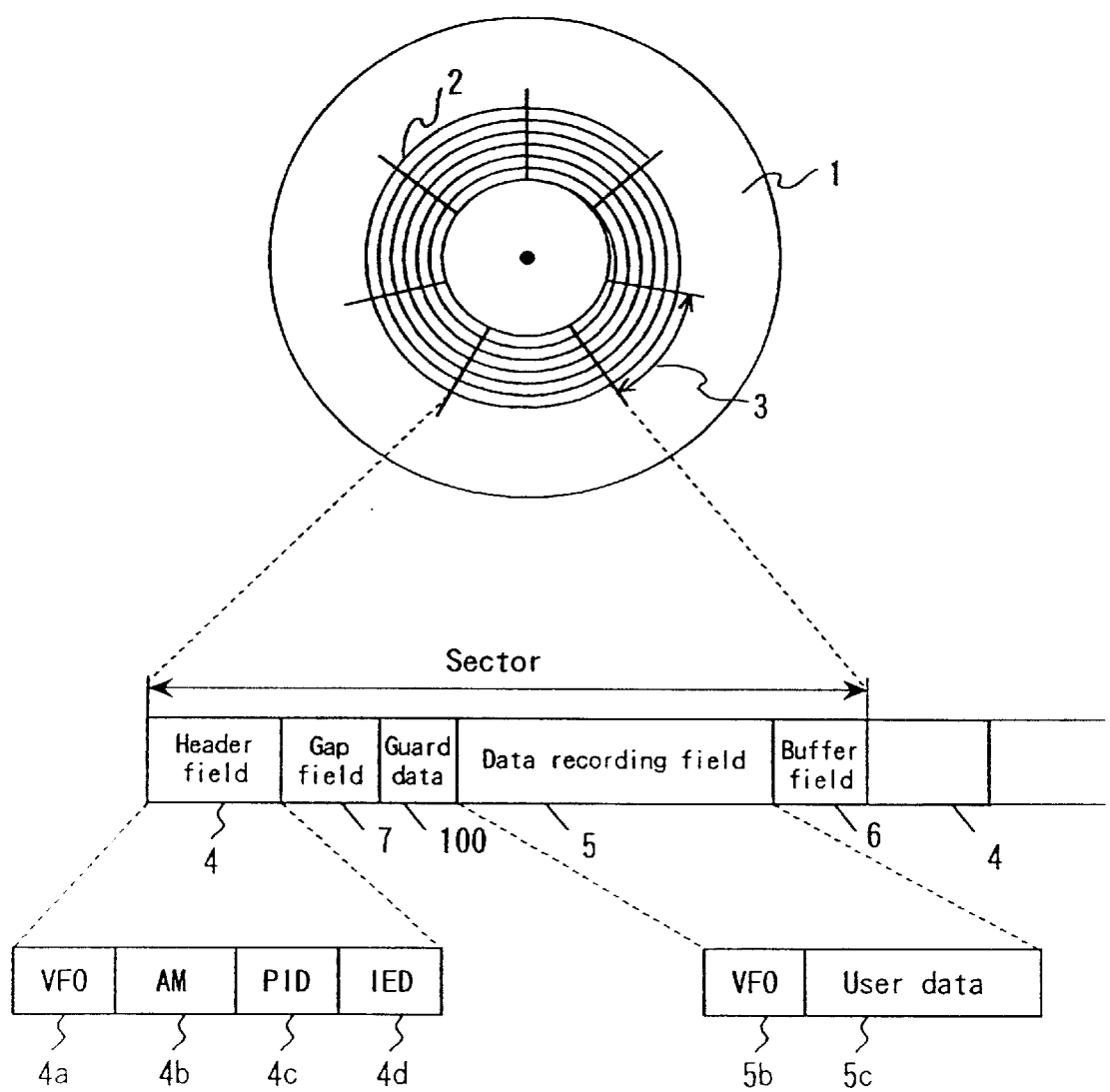
FIG. 1 is a diagram showing a format structure of an optical disc according to a first embodiment of the invention.

Referring now to the drawings, embodiments of the invention are described below.

Embodiment 1

Figure 18:
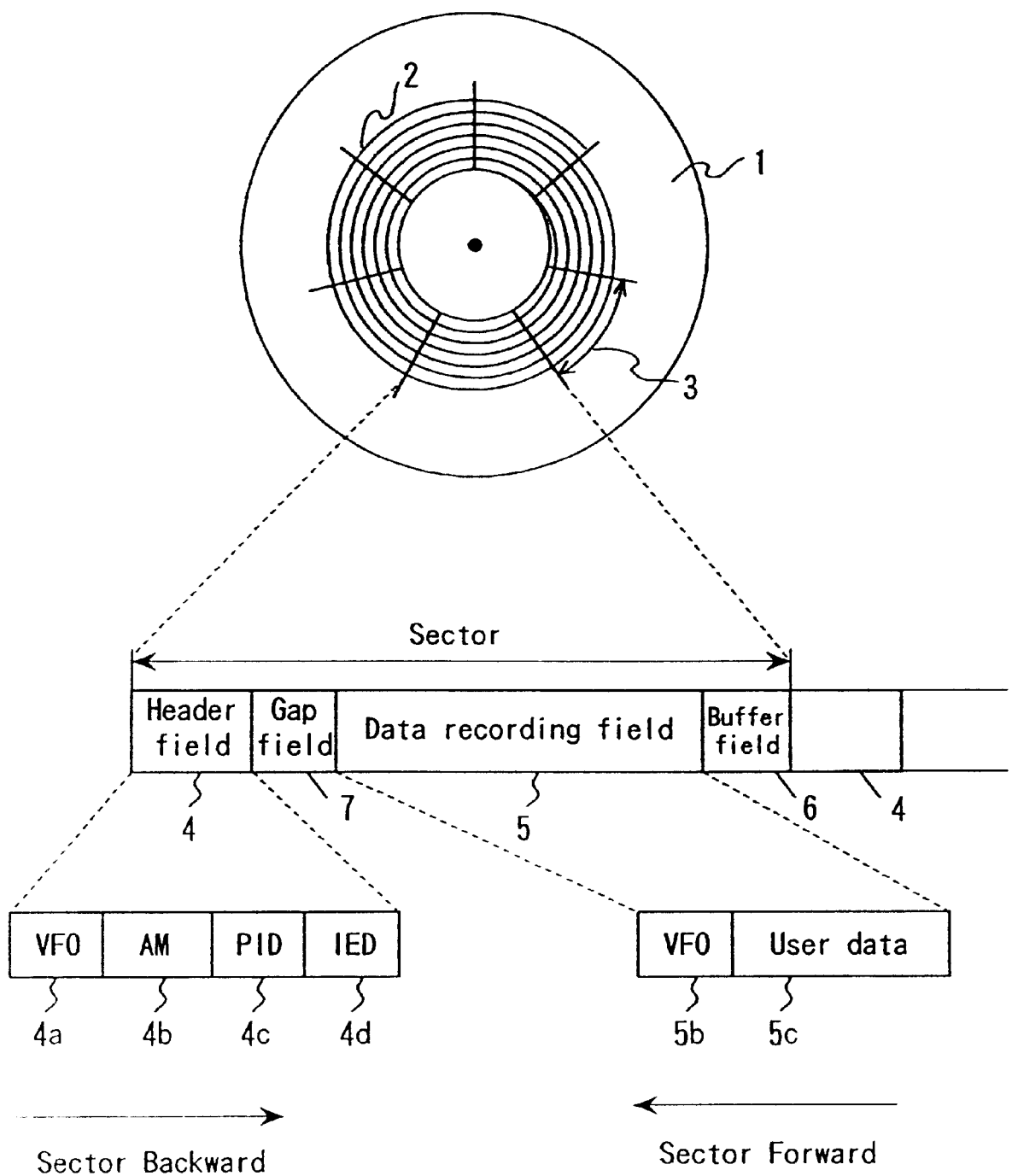
FIG. 18 is a format of a conventional recordable optical disc.

FIG. 1 shows a format structure of an optical disc according to a first embodiment of the invention. Explanation is omitted for the parts also shown in the format structure of FIG. 18 relating to the prior art described above.

As compared with the prior art, the added and modified portion is a guard data recording field 100 for recording guard data, disposed between the header field 4 and data recording field 5. The guard data recording field 100 is disposed behind the gap field 7 and immediately before the data recording field 5. Since no signal is recorded in the gap field 7, recording of signals in the sector begins at the guard data recording field 100.

Figure 2:
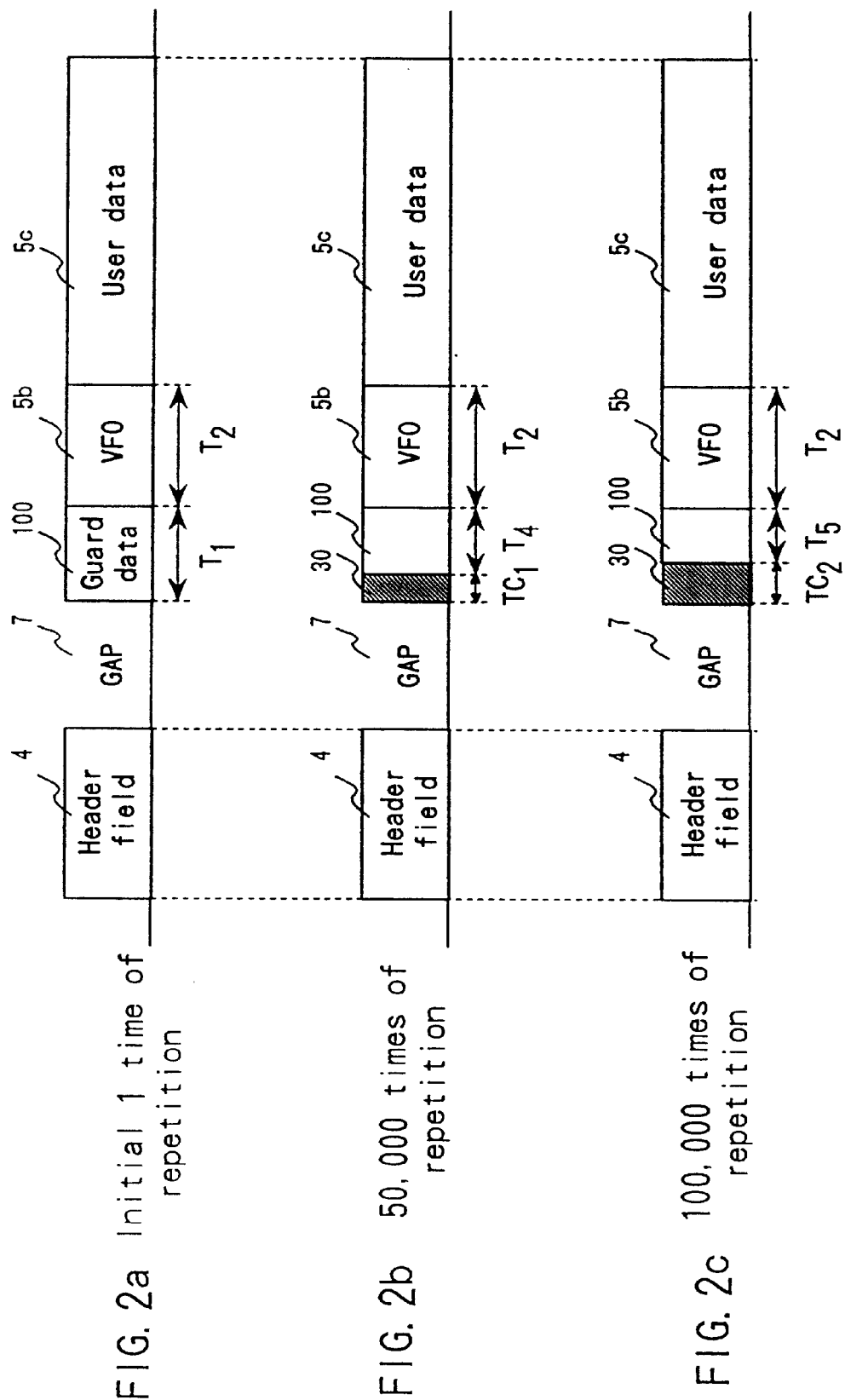
FIGS. 2a–c show deterioration of the recording medium and synchronous signal field VFO at the record start point when recorded repeatedly.

Referring to FIGS. 2a–c, in the optical disc having the format structure in FIG. 1, the relation between deterioration of the recording medium at the record start point and synchronous signal field VFO upon repeated recording is explained.

FIGS. 2a–c show the mode of deterioration of the recording medium near the record start point of the data recording field 5, in which FIG. 2a shows a single repetition only, FIG. 2b shows 50,000 repetitions, and FIG. 2c shows 100,000 repetitions.

In the initial stage of a single repetition in FIG. 2a, the guard data recording field 100 at the start point of recording of the sector, is free from medium deterioration, and thus there is no problem. Here, the interval of the guard data recording field in the initial state is supposed to be T1, and the internal of the synchronous signal field VFO is supposed to be T2.

After 50,000 repetitions as shown in FIG. 2b, medium deterioration occurs and is indicated by 30 for an interval of TC1 at the beginning of the guard data recording field 100, the guard data recording field 100 shortens to T4 by the interval TC1 of the length of the medium deterioration 30. However, if medium deterioration occurs, only the guard data recording field 100 in which guard data is recorded is shortened in length. The synchronous signal field VFO necessary for synchronization is completely free from the effects of medium deterioration 30, and the synchronous interval T2 remains the same as in the initial state. Hence, as in the initial state, stable acquisition of synchronism is realized.

After 100,000 repetitions as shown in FIG. 2c, the medium deterioration 30 at the beginning of the guard data recording field 100 is extended to interval TC2. As a result, the guard data recording field 100 shortens further to be T5. However, only the guard data recording field in which guard data is recorded is shortened in length, and the synchronous signal field VFO necessary for synchronization is completely free from the effects of the medium deterioration 30, and the synchronous interval T2 likewise remains the same as in the initial state. Hence, as in the initial state, stable acquisition of synchronism is realized.

As explained, according to the present embodiment, by providing the guard data recording field 100 for recording guard data between the header field and the data recording field containing synchronous signal, the synchronous signal field is prevented from being shortened by the medium deterioration caused by repeated recording, so that the acquisition of synchronism is stabilized.

Embodiment 2

Figure 3:
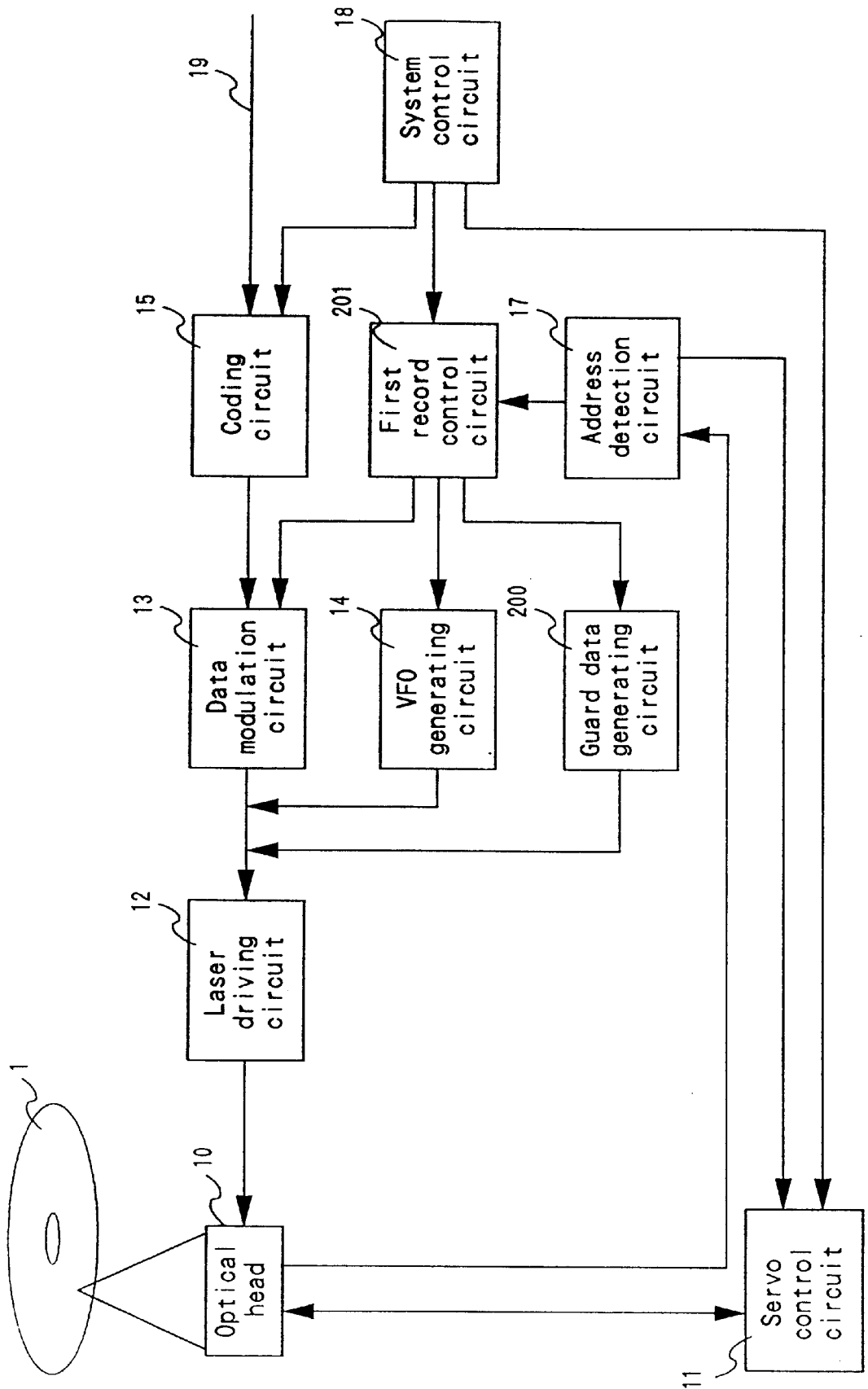
FIG. 3 is a block diagram of an optical disc device according to a second embodiment of the invention for recording in and reproducing from an optical disc having a guard data recording field.

Referring now to FIG. 3, an optical disc device according to a second embodiment of the invention which is intended to record and reproduce in an optical disc having a guard data recording field at the beginning of a sector is described. Explanation is omitted for the parts already discussed in the optical disc device of FIG. 18 relating to the prior art described above.

What is added to the prior art is a guard data generating circuit 200 and a first record control circuit 201. The guard data generating circuit 200 generates specified guard data. The guard data of the guard data generating circuit 200 is first provided, synchronous signal VFO of the synchronous signal VFO generating circuit 14 is added next, and then modulated data of the data modulating circuit 13 is added later still. Such data timing is controlled by the first record control circuit 201. The combined guard data, synchronous signal VFO, and modulated data are provided to the laser driving circuit 12, and is recorded on the optical disc.

According to the present embodiment, as described herein, in addition to the conventional constitution of the optical disc device, the guard data generating circuit 200 for generating guard data and first record control device 201 are provided, and by recording the guard data in the guard data recording field 100 between the header field 4 and the synchronous signal field VFO at the starting portion of the data recording field 5, the synchronous signal is protected from medium deterioration caused by repeated recording, so that an optical disc device stable in acquisition of synchronism is realized.

Embodiment 3

FIGS. 4a–d and FIGS. 5a–d show the relationship between the deterioration of recording medium at the record start point upon repeated recording and the synchronizing interval of synchronous signal field VFO, in an optical disc having a format structure according to a third embodiment of the present invention. In the optical disc of the third embodiment, the recording pattern of guard data in the guard data recording field is the same as the recording pattern of the synchronous signal field VFO. In the boundary of the guard data recording field and synchronous signal field, moreover, the phase of the recording pattern is matched so as not to cause discontinuation.

Figure 4A:
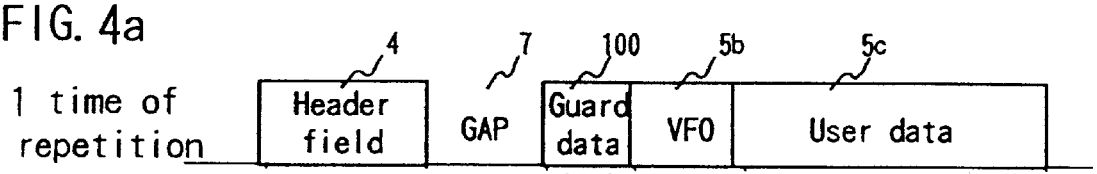
FIGS. 4a–d depict a synchronous signal section in which guard data in a guard data recording field has a pattern different from the synchronous signal VFO.
Figure 4B:
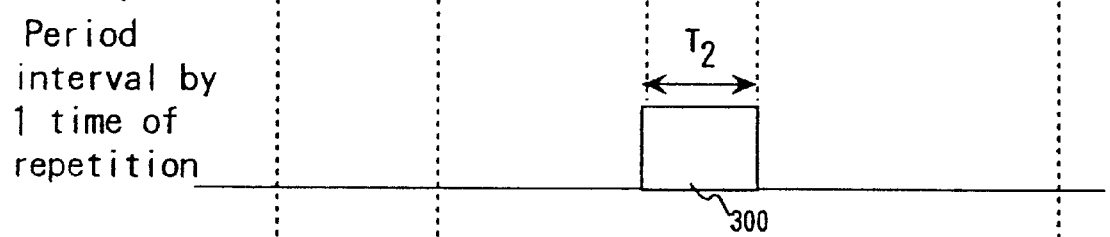
Figure 4C:
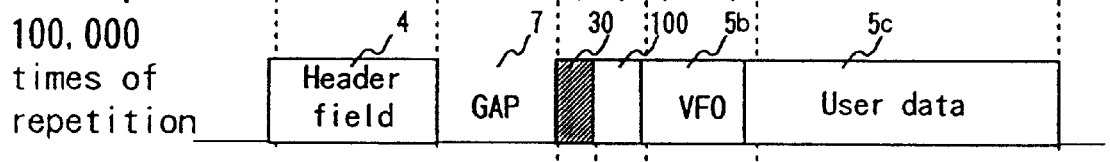
Figure 4D:
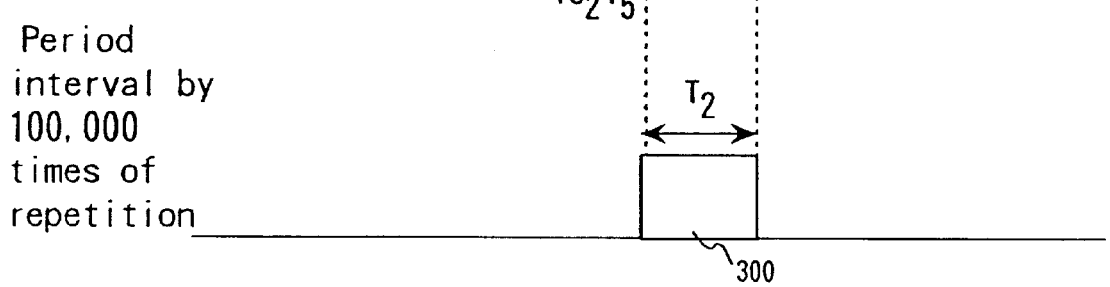

First, in FIGS. 4a–d, the guard data in the guard data recording field is different from the recording pattern of the synchronous signal field VFO. FIG. 4a shows the data recording field after one repetition, FIG. 4b shows the lock-in range on synchronization, FIG. 4c shows the data recording field after 100,000 times of repetition, and FIG. 4d shows the lock-in range on synchronization after 100,000 times of repetition.

In the initial state after one repetition, the guard data recording field 100 at the record start point of the data recording field 5 is free from medium deterioration. The interval of the guard data recording field in the initial state is supposed to be T1, and the interval of the synchronous signal field VFO I supposed to be T2.

The lock-in range on synchronization 300 after one repetition is the interval T2 of the synchronous signal field VFO.

In the case after 100,000 times of repetition shown in FIG. 4c, at the beginning of the guard data recording region 100, medium deterioration 30 occurs for an interval of TC2. Accordingly, the guard data recording field 100 is shortened to an interval T5. However, only the guard data recording field in which guard data is recorded is shortened, and the synchronous signal field VFO necessary for synchronization is not influenced at all by the medium deterioration 30.

The lock-in range on synchronization 300 after 100,000 times as shown in FIG. 4d remains at T2 as in the initial state after one repetition. Hence, as in the initial state, a stable acquisition of synchronism is realized.

In FIGS. 5a–d, the guard data in the guard data recording field is the same as the recording pattern of the synchronous signal field VFO. Moreover, so as not to be discontinuous at the boundary of the guard data recording field and synchronous signal field, the phase of the recording pattern is matched. FIG. 5a shows the data recording field after one repetition, FIG. 5b shows the lock-in range on synchronization, FIG. 5c shows the data recording field after 100,000 times of repetition, and FIG. 5d shows the lock-in range on synchronization after 100,000 times of repetition.

In the initial state after one repetition as shown in FIG. 5a, the guard data recording field 100 at the record start point of the data recording field 5 is free from medium deterioration. The interval of the guard data recording field in the initial state is supposed to be T1, and the interval of the synchronous signal field VFO is supposed to be T2.

The lock-in range on synchronization 400 after one time of repetition is thus the sum T1+T2 of interval T1 of the guard data recording field and interval T2 of the synchronous signal field VFO because the signal in the guard data recording field is the same recording pattern as in the synchronous signal field VFO and continuity is maintained. As compared with T2 of the lock-in range on synchronization 300 in the recording pattern in which the signal of the guard data recording field is different from the synchronous signal field VFO explained in FIGS. 4a–d, the lock-in range in the present embodiment is extended by the portion of the interval T1 of the guard data recording field.

In the case after 100,000 times of repetition shown in FIG. 5c, at the beginning of the guard data recording region 100, medium deterioration 30 occurs for an interval of TC2. Accordingly, the guard data recording field 100 is shortened to an interval T5. However, only the guard data recording field in which guard data is recorded is shortened, and the synchronous signal field VFO necessary for synchronization is not at all influenced by the medium deterioration 30.

The lock-in range on synchronization 400 after 100,000 times of repetition shown in FIG. 5d is the sum T5+T2 of interval T5 of the guard data recording field 100 and interval T2 of the synchronous signal field VFO. As compared with T2 of the lock-in range on synchronization 300 in the recording pattern in which the signal of the guard data recording field is different from the synchronous signal field VFO explained in FIGS. 4a–d, the lock-in range is extended by the portion of the interval of the guard data recording field.

Accordingly, even if after 100,000 recording repetitions causing medium deterioration at the record start point, the lock-in range on synchronization is longer than the interval T2 of the initial synchronous signal field VFO by the portion of the interval T5 of the guard data recording field. As a result, stability and reliability of (phase locked loop (PLL) synchronization are improved.

As described herein, according to the present embodiment, by providing guard data in the guard data recording field 100 disposed between the header field 4 and data recording field of the optical disc, with the same recording pattern as in the synchronous signal field VFO, and keeping continuity, the lock-in range on synchronization can be extended beyond the synchronous signal field VFO, and, therefore, if medium deterioration due to repeated recording occurs, the stability and reliability of acquisition of synchronism can still be maintained.

Embodiment 4

Figure 6:
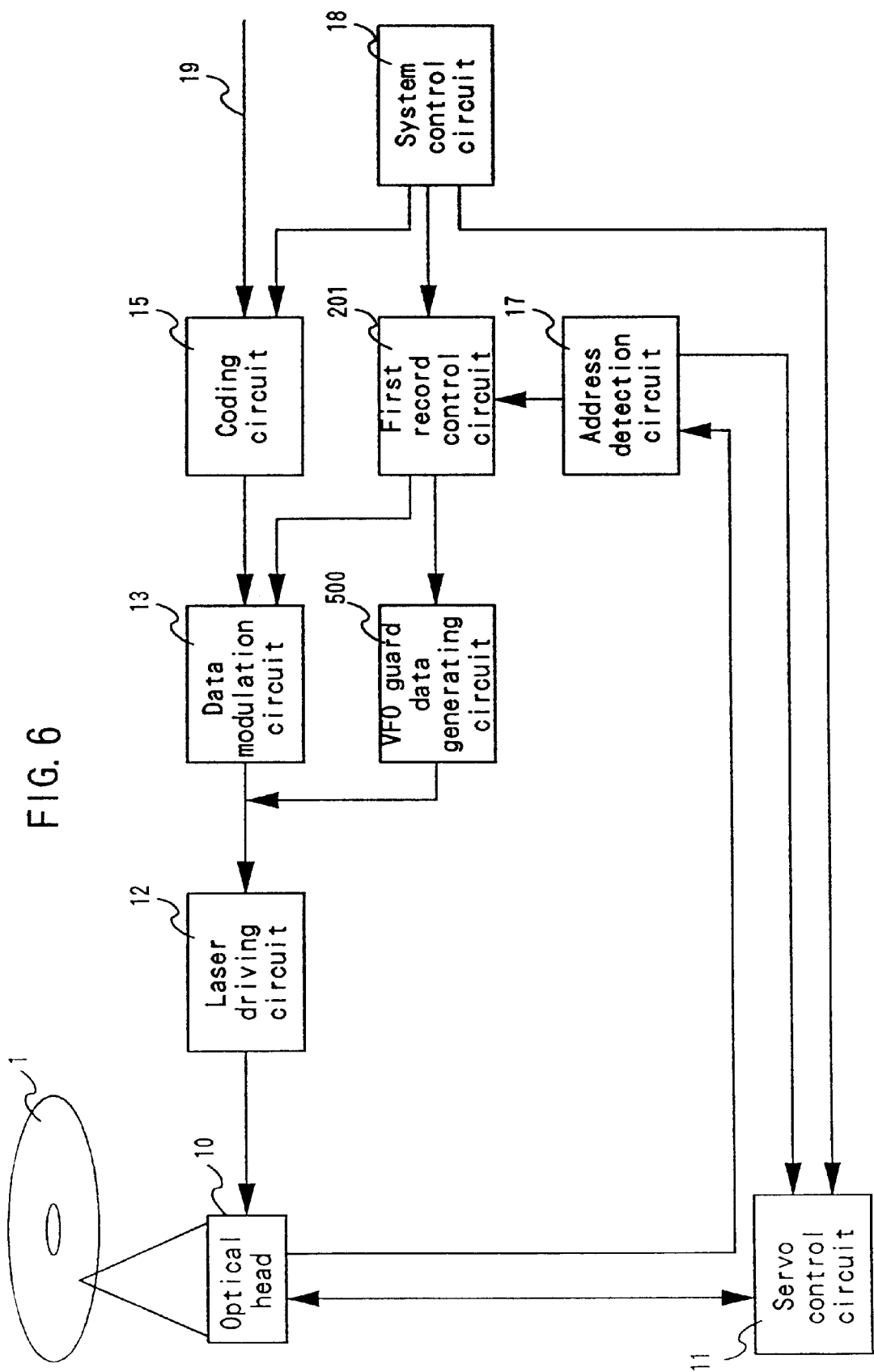
FIG. 6 is a block diagram of an optical disc according to a fourth embodiment for recording and reproducing in which the recording pattern in the guard data recording field is the same as the synchronous signal field VFO.
Figure 19:
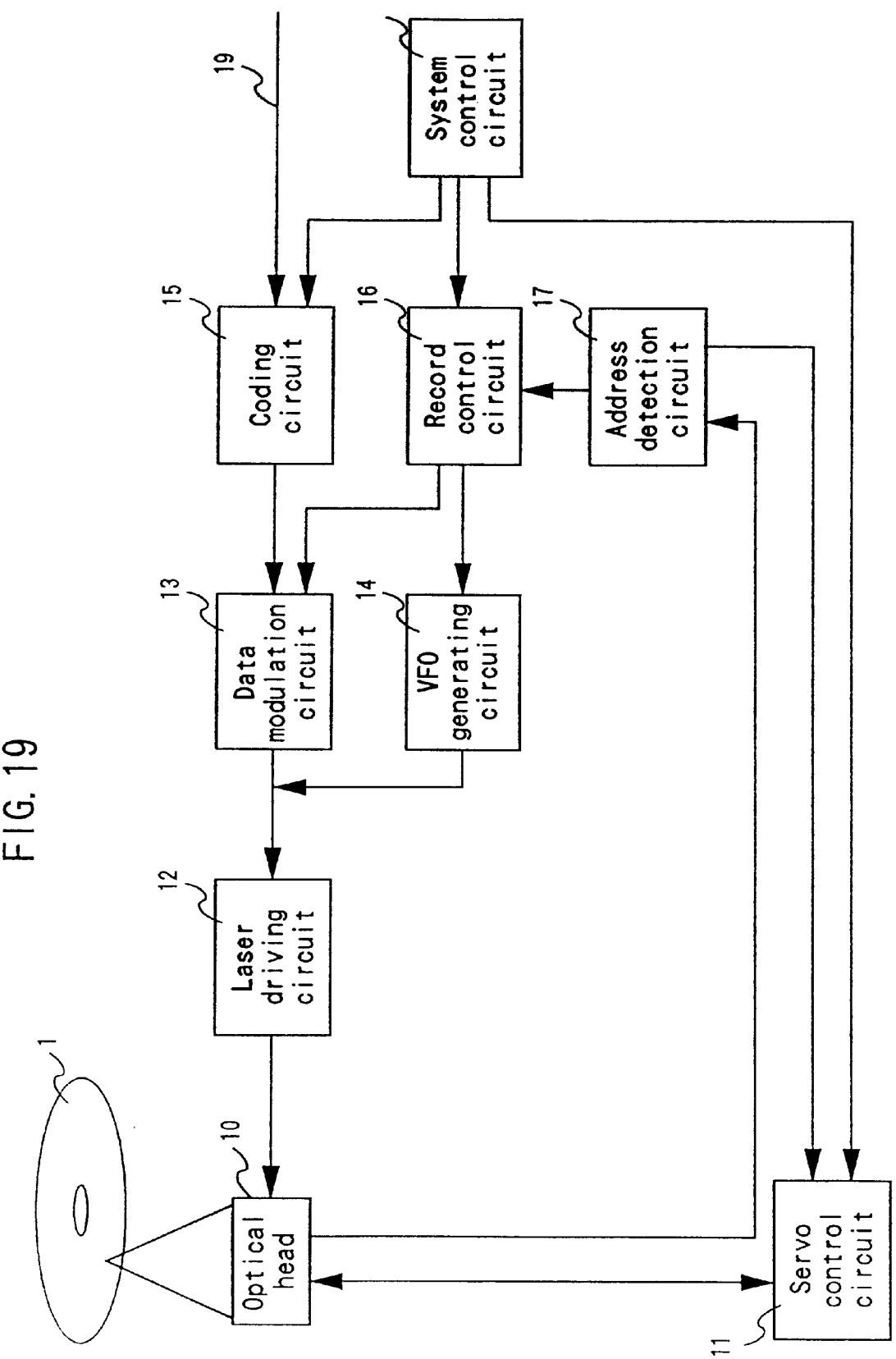
FIG. 19 is a block diagram of a conventional recordable optical disc device.

Referring now to FIG. 6, an optical disc device according to a fourth embodiment of the invention is described, which embodiment is intended to record and reproduce by providing the recording pattern guard data recording field at the beginning of a sector, the guard data being the same as in the synchronous signal field VFO. Explanation is omitted for the parts already described in the optical disc device in FIG. 19 relating to the prior art described above.

What is added to the prior art is a VFO guard data generating circuit 500 and a first record control circuit 201. The VFO guard data generating circuit 500 generates the same recording pattern in the guard data recording field 100 and synchronous signal field VFO. The first record control circuit 201 generates continuous gate timing so as not to cause any discontinuity between the guard data recording field 100 and synchronous signal field 5b. As a result, in the guard data recording field 100 and synchronous signal field 5b, the same recording patterns for synchronization are generated continuously.

To the beginning of the recording pattern generated in the VFO guard data generating circuit 500, modulated data from the data modulation circuit 13 is added. Such data timing is controlled by the first record control circuit 201. The combined data is provided to a laser driving circuit 12 in a later stage, and is recorded on the optical disc.

According to the present embodiment, as described herein, by adding the VFO guard data generating circuit 500 for generating common recording patterns in the guard data recording field 100 and synchronous signal field VFO and the fist record control circuit 201 to the conventional optical disc device, the recording pattern for synchronization is recorded in the guard data recording region 100 between the header field 4 and synchronous signal field VFO, and, therefore, the lock-in range on synchronization is extended beyond the interval of the synchronous signal field VFO, so that an optical disc device enhanced in reliability and stabilization of acquisition of synchronism even in view of medium deterioration occurring due to repeated recording can be realized.

Embodiment 5

Figure 7:
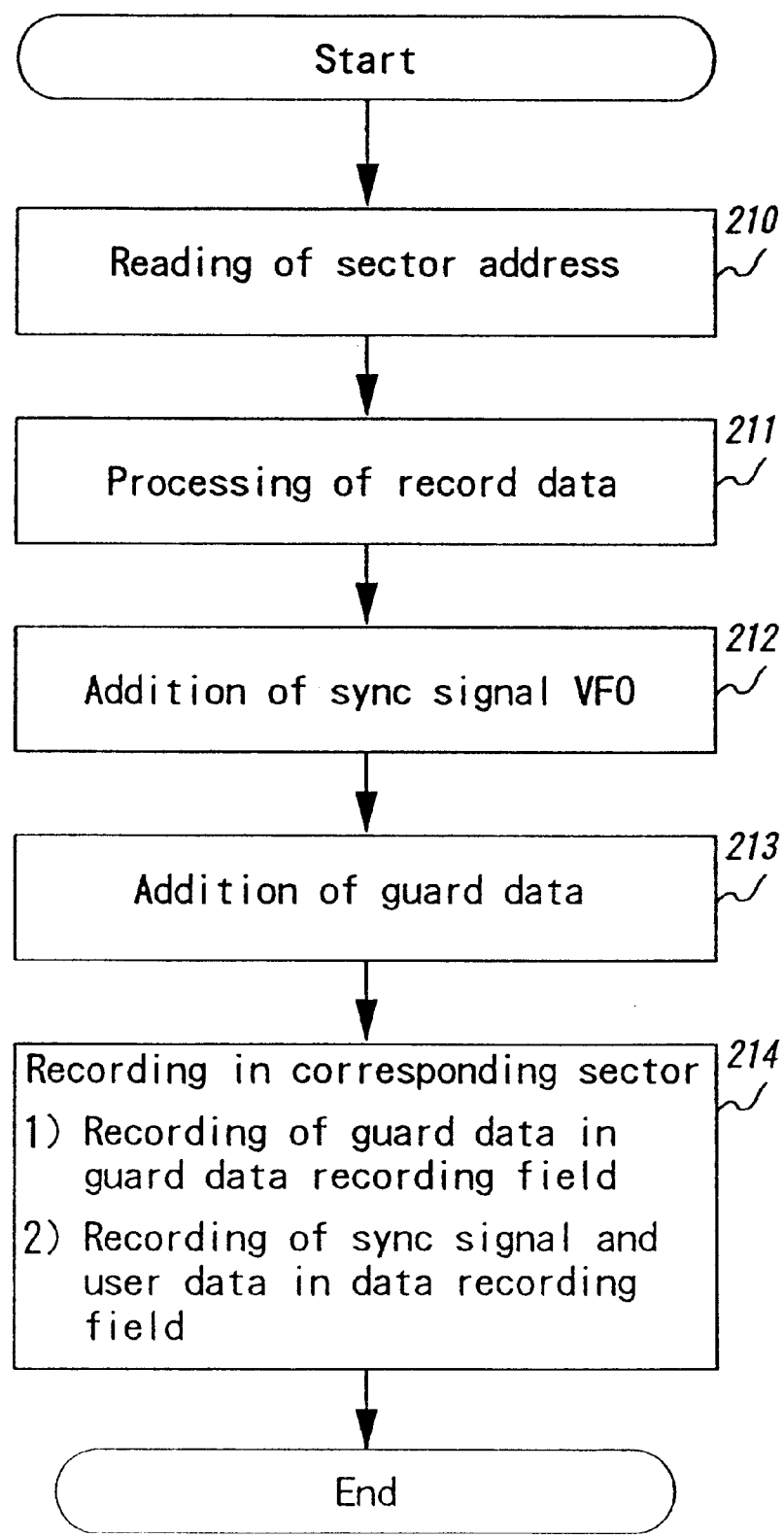
FIG. 7 is a flowchart for explaining a recording method for an optical disc according to a fifth embodiment for recording and reproducing in which the recording pattern in the guard data recording field is the same as the synchronous signal field VFO.

FIG. 7 is a step-by-step explanation of a recording method for an optical disc according to a fifth embodiment of the present invention for recording and reproducing the same recording pattern in the synchronous signal field VFO in the guard data recording field at the beginning of a sector.

At step 210, the optical disc device reads the address information of the optical disc by a command from a host system in an address detecting circuit 17 (see FIG. 6, for example). A system control circuit 18 confirms whether an address of the sector is to be recorded or not.

At step 211, the record data is coded in a coding circuit 15, and is modulated in a data modulation circuit 13 that outputs modulated data.

At step 212, to the beginning of the modulated data, a synchronous signal VFO for synchronization is added by a VFO generating circuit 14.

At step 213, to the beginning of the synchronous signal VFO, guard data for suppressing the effects of medium deterioration is added by a guard data generating circuit 200.

Then, at step 214, in the corresponding sector to be recorded, the record data generated at steps 211, 212, and 213 are controlled by the first record control circuit 201 and recorded in the proper order. Specifically, the guard data is recorded in the guard data recording field, and the synchronous signal VFO and user data are recorded in the data recording field.

With these steps, the data can be recorded and reproduced in the optical disc in the recording format shown in FIG. 1.

Embodiment 6

Referring now to FIGS. 8a–d, an optical disc according to a sixth embodiment of the invention is described below, in which the recording interval of the guard recording field is changed at random in every recording.

In FIGS. 8a–d, the variable recording intervals of the guard data recording field 100 in sectors 1, 2, 3, and 4, respectively, are shown.

In FIG. 8a, relating to sector 1, the recording interval of the guard data recording field 100 is T1, and the interval of the succeeding synchronous signal field VFO is T2. The combined interval of the guard data recording field 100 and synchronous signal field VFO is T1+T2.

In FIG. 8b, relating to sector 2 next to sector 1, the recording interval of the guard data recording field 100 is extended by interval dT compared to sector 1 to be T1+dT. The combined interval of the guard data recording field 100 and synchronous signal field VFO is T1+T2+dT. It is understood that since the guard data recording field 100 is extended by dT, the terminal end of the data recording field is shifted backward by the same amount.

In FIG. 8c, relating to sector 3 next to sector 2, the recording interval of the guard data recording field 100 is extended by interval 2dT compared to sector 1 to be T1+2dT. The combined interval of the guard data recording field 100 and synchronous signal field VFO is thus T1+T2+2dT. As the guard data recording field 100 is extended by 2dT, the terminal end of the data recording field is likewise shifted backward by the same amount.

In FIG. 8d, relating to sector 4 next to sector 3, the recording interval of the guard data recording field 100 is T1, as in sector 1. The combined interval of the guard data recording field 100 and synchronous signal field VFO is thus again T1+T2.

According to this scheme, in every recording, the recording interval in the guard data recording field 100 is randomly changed in every sector at a time resolution of dT. The number of bits for randomly changing this time resolution dT is determined appropriately by the system configuration. A specific example with respect to a phase change optical disc is given below.

When the channel bit frequency is 29.18 MHz, for the period t=34.27 nsec of one bit of the channel bit, supposing one byte of data corresponds to 16 channel bits, 16t=548 nsec is defined to be one byte in the data. The line velocity is about 6 m/s. The guard data recording field 100 of interval T1=20 bytes changes by 20 bytes+K (K=0 to 7), in eight types of 0 to 7 bytes, at a resolution in the unit of one byte. By such random time shift, since the start point of the synchronous signal field VFO can be changed at random, recording deterioration resulting from the same recording pattern can be prevented. The recording interval of the guard data recording field is 20 bytes*6 m/s*548 nsec=66 μm.

Although not shown in FIGS. 8a–d, the random time shift is preferably also given to the guard data recording field 100 in which the recording pattern is the same as in the synchronous signal field VFO. Accordingly, the length of gap field 7 is changed randomly in every recording. For instance, the gap field interval of 10 bytes (34 μm) is changed in 16 ways corresponding to 0 to 15 channel bits, at the resolution in the unit of one channel bit t=34.27 nsec. This is described in detail later.

When using such random time shift, according to the relation between the number of times of recording and the deterioration interval in the guard data recording field 100, the deterioration interval is 7 μm at 20,000 repeated recordings, 10 μm at 50,000 repetitions, and 33 μm at 100,000 repetitions.

As a result of employing random time shift, it is found that the deterioration of the recording interval of the guard data recording field 100 is suppressed to 33 μm even if recording is repeated 100,000 times. The recording interval of the guard data recording field 100 is set at 66 μm, and even after 100,000 times of recording, the deterioration of the recording interval is not extended up to the synchronous signal field VFO, so that the acquisition of synchronism remains stable.

Incidentally, since the recording pattern of the guard data recording region is identical to the synchronous signal VFO, the channel bits repeating as "00010001," and alternate repetition of mark and space in the length of four channel bits on the recording medium may be employed.

Embodiment 7

Figure 9:
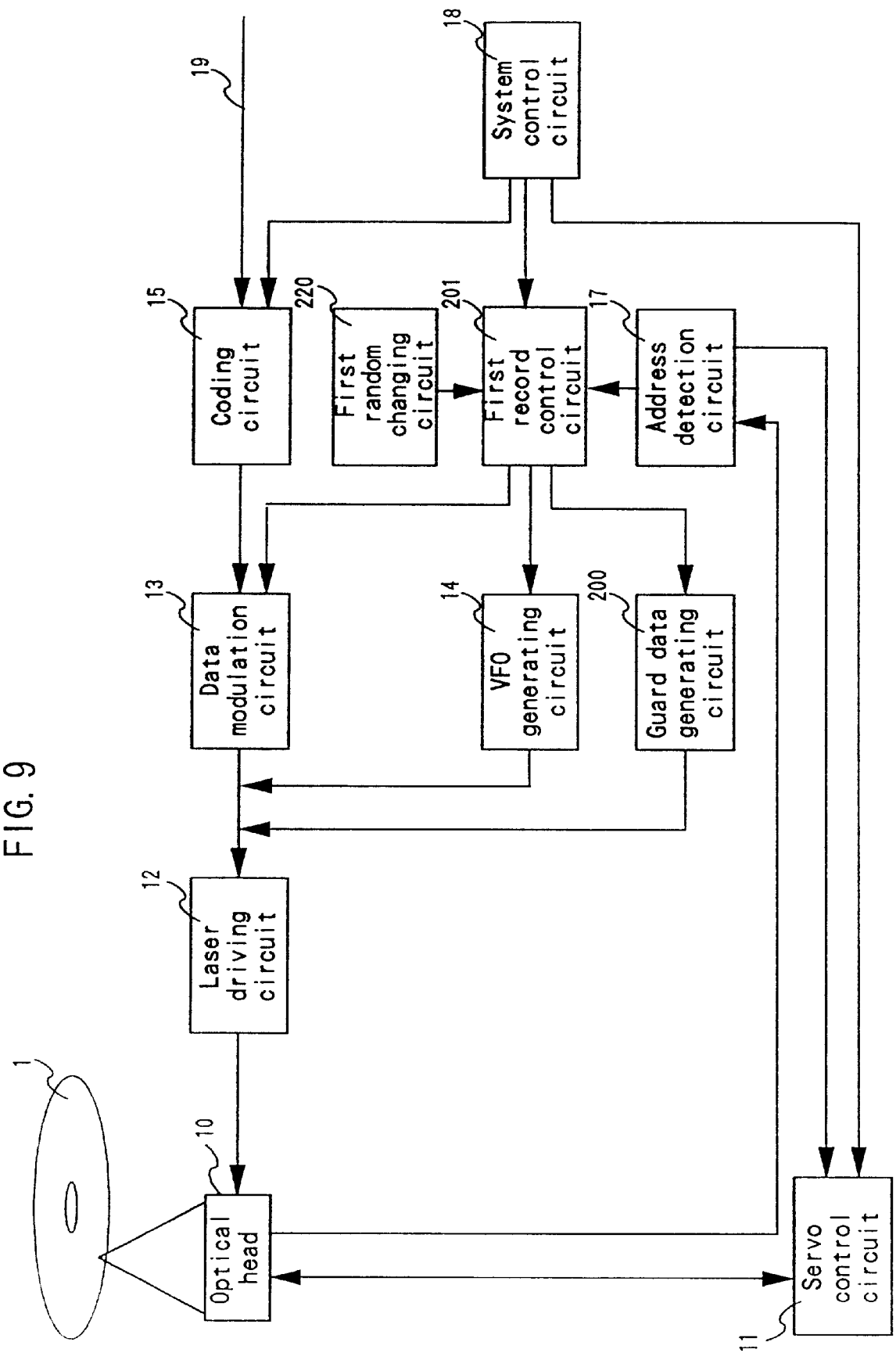
FIG. 9 is a block diagram of an optical disc device according to a seventh embodiment for recording and reproducing a signal in an optical disc by changing randomly the sector recording section upon every recording.

Referring now to FIG. 9, an optical disc device according to a sixth embodiment of the invention is described, which is intended to record and reproduce in an optical disc while randomly changing the recording interval of the guard data recording field in every recording. Explanation is omitted for the parts already described with respect to the optical disc device in FIG. 19 relating to the prior art described above.

What is added to the prior art is a guard data generating circuit 200, a first record control circuit 201, and a first random changing circuit 220. The guard data generating circuit 200 generates specific guard data. To the beginning of the guard data from the guard data generating circuit 200, a synchronous signal VFO from a synchronous signal VFO generating circuit 14 is added, and then modulated data from a data modulation circuit 13 is added thereafter. The first random changing circuit 220 changes the recording interval of the guard data recording region, by 20 bytes+K (K changing randomly from 0 to 7), at the resolution of 1 byte. While randomly changing the recording interval of the guard data recording field, the timing of the combined guard data, synchronous signal VFO and modulated data is controlled by the first record control circuit 201, and these record signals are provided to a laser driving circuit 12 in a later stage, and recorded in the sectors on the optical disc while changing randomly in every recording.

As described herein, according to the present embodiment, by adding the guard data generating circuit 200 for generating guard data, first record control circuit 201 and first random changing circuit 220 to the conventional optical disc device, the record start point is changed randomly in every recording, and thus signal deterioration due to repeated recording of synchronous signal VFO and user data can be suppressed.

Embodiment 8

Figure 10:
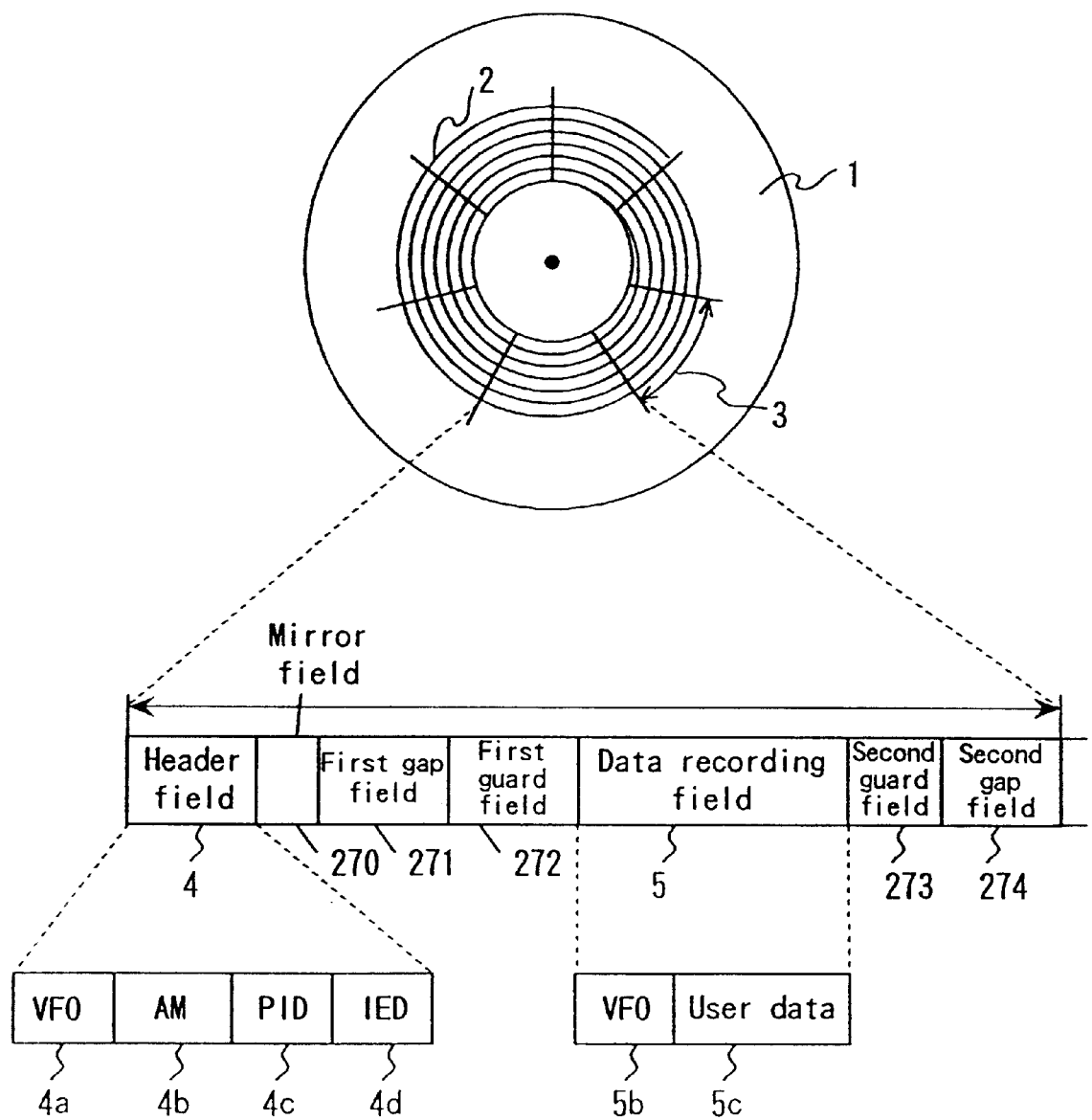
FIG. 10 is a format of an optical disc for recording and reproducing by randomly changing the recording section in first and second gap fields and first and second guard data recording fields, in every sector, upon every recording.

FIG. 10 shows a format structure of an optical disc according to an eighth embodiment of the present invention for recording and reproducing by randomly changing the length of first and second gap fields, and first and second guard data recording fields, in every recording, and setting the changing amount of the first gap field smaller than the changing amount of the first guard data recording field. Explanation is omitted for the parts already described in the format structure shown in FIG. 18 relating to the prior art described above.

What is added to the prior art: is a mirror field 270 used to adjust a servo signal, a first gap field 271 of no-signal interval, a first guard data recording field 272 for recording guard data, a second guard data recording field 273 for recording guard data next to the data recording field 5, and a second gap field 274 of no-signal interval.

Herein, the recording interval of the first and second gap fields 271, 274, and first and second guard data recording fields 272, 273 is changed randomly in each sector in every recording.

Figure 11:
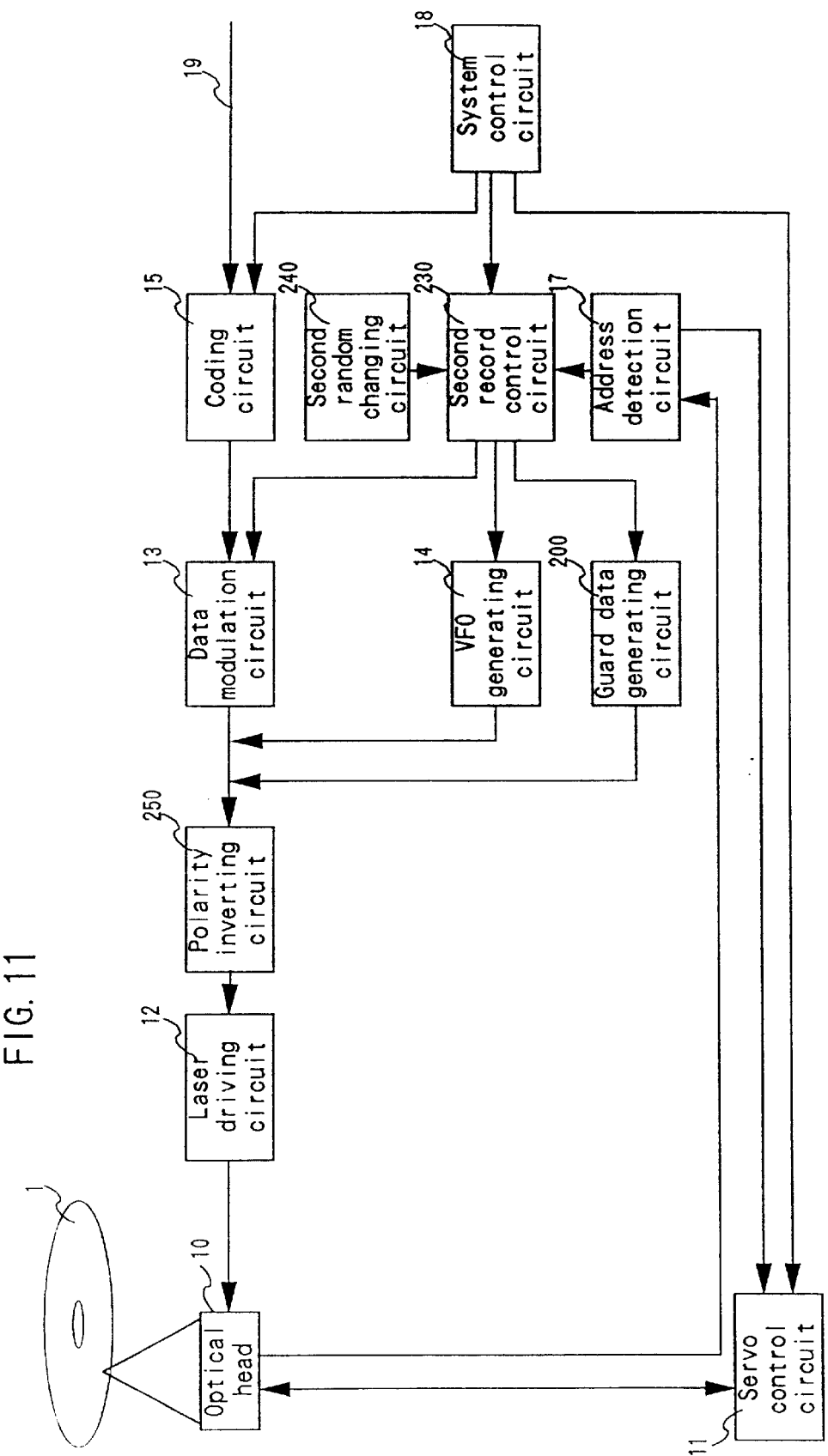
FIG. 11 is a block diagram of an optical disc device according to an eighth embodiment for recording and reproducing by changing randomly the recording section in first and second gap fields and first and second guard data recording fields, in every sector, upon every recording.

FIG. 11 depicts an optical disc device for recording and reproducing in an optical disc by randomly changing the length of first and second gap fields, and first and second guard data recording fields, in every recording, and setting the changing amount of the first gap field smaller than the changing amount of the first guard data recording field. Explanation is omitted for same parts already described with respect to the optical disc device of FIG. 19 relating to the prior art described above.

What is added to the prior art device is a guard data generating circuit 200, a second record control circuit 230, a second random changing circuit 240, and a polarity inverting circuit 2!50. The guard data generating circuit 200 generates specific guard data. To the beginning of the guard data from the guard data generating circuit 200, a synchronous signal VFO from a synchronous signal VFO generating circuit 14 is added, and then modulated data from a data modulation circuit 13 is added thereafter. The second random changing circuit 240 changes randomly the recording interval of the first and second gap fields. For example, the first gap field is changed by 10 bytes+J/16 (J changing randomly from 0 to 15) in every recording. Since the resolution of the changing amount is J/16, one byte is composed of 16 bits in channel bits. The second gap field is changed by 25 bytes–J/16 (J changing randomly from 0 to 15) in every recording. Accordingly, the total length of the recording interval of the first gap field and the recording interval of the second gap field is kept constant. Moreover, the second random changing circuit 240 also randomly changes the recording intervals of the first and second guard data recording fields. For example, the first guard data recording field is changed by 20 bytes+K (K changing randomly from 0 to 7, at the resolution of 1 byte. Similarly, the second guard data recording field is changed by 55 bytes–K (K changing randomly from 0 to 7), at the resolution of 1 byte. Herein, the total length of the recording interval of the first guard data recording field and the recording interval of the second guard data recording field is also kept constant.

While randomly changing the recording interval of the first and second gap fields and first and second guard data recording fields, the timing of the combined guard data, synchronous signal VFO, and modulated data is controlled in the second record control circuit 230. The record signal composed of these signals is passed to the polarity inverting circuit 250 in a later stage, and the polarity of the record signal is changed randomly in the sector interval in every recording. The record signal from the polarity inverting circuit 250 is provided to a laser driver circuit 12, and the recording interval of the first and second gap fields S and the recording interval of the first and second guard data recording fields are changed randomly, and the polarity of the record signal is changed randomly and is recorded in the sector on the optical disc.

Figure 12:
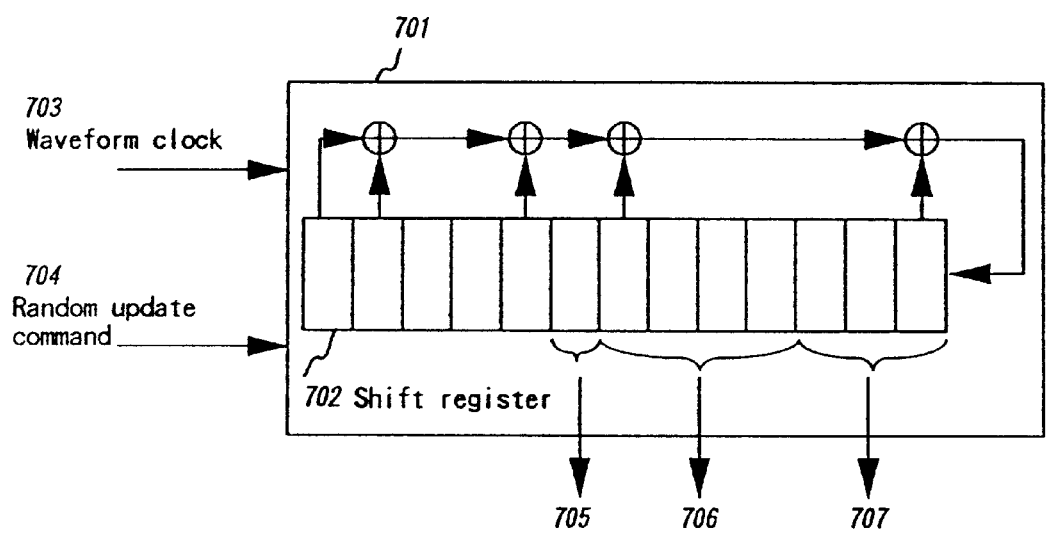
FIG. 12 is a block diagram showing an example of a second random changing circuit.

Referring now to FIG. 12, a structural example of the second random changing circuit 240 is described. In FIG. 12, a random changing circuit 701 is composed of 13 stages of shift registers 702, and is designed to receive a clock 703 and a random update command 704. By the command of the random update command 704, the signal polarity and the changing amount are determined randomly by a one-bit signal 705 for determining the polarity of record signal, a four-bit signal 706 for determining the changing amount of the first and second gap fields, and a three-bit signal 707 for determining the changing amount of the first and second guard data recording fields.

Figure 13:
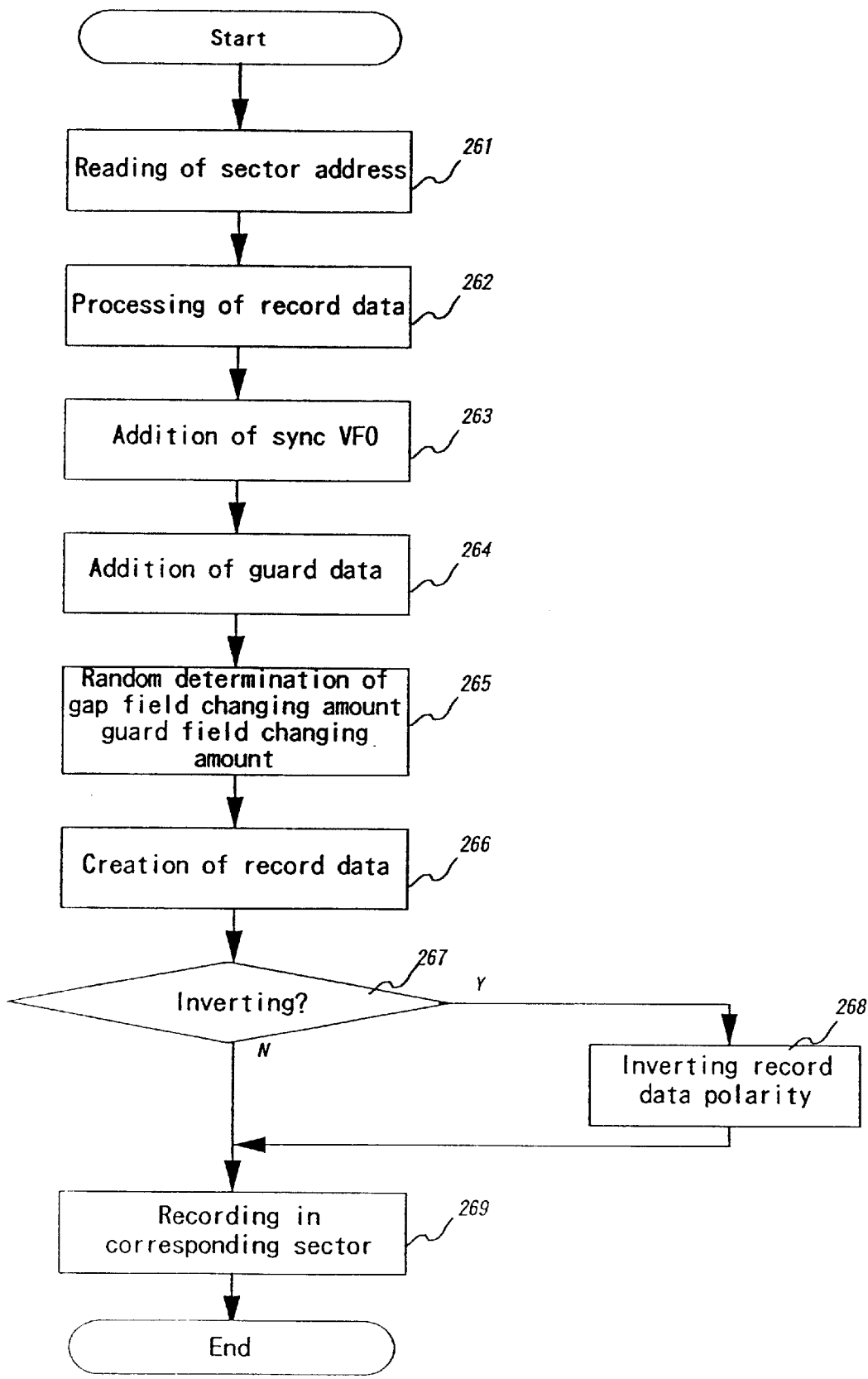
FIG. 13 is a flowchart for explaining a recording method of the optical disc according to the eighth embodiment.

FIG. 13 is a flowchart showing the operation for rewriting the record information of a sector by this optical disc device.

Referring also to FIG. 11, the operation is described below according to the flowchart in FIG. 13.

At step 261, the optical disc device reads the address information of the optical disc by the command from a host system in an address detecting circuit 17. A system control circuit 18 confirms whether an address of a sector is to be recorded or not.

At step 262, the record data is coded in a coding circuit 15, and is modulated in a data modulation circuit 13 that outputs modulated data.

At step 263, to the beginning of the modulated data, a synchronous signal VFO for synchronization is added by a VFO generating circuit 14.

At step 264, to the first guard data recording field at the beginning of the synchronous signal VFO and the second guard data recording field consecutive to the user data, guard data for suppressing the effects of medium deterioration are added by a guard data generating circuit 200.

At step 265, the changing amount of the recording interval of the first and second gap fields is determined randomly by the changing amount of 0 to 15 channel bits, at the resolution of one channel bit. Similarly, the changing amount of the recording interval of the first and second guard data recording fields is determined randomly by the changing amount of 0 to 7 bytes, at the resolution of one byte. That is, by the extended portion of the first gap field, the length of the second gap field becomes shorter, and the total length is unchanged. Similarly, the total length of the first and second guard data recording fields does not vary.

At step 266, while randomly changing the recording interval of the first and second gap fields and first and second guard data recording fields, a record signal is created from the combined guard data, synchronous signal VFO, and modulated data.

At step 267, it is determined whether to invert the polarity of the record signal.

At step 268, if determined to invert the polarity at step 267, the polarity of the record signal is inverted.

At step 269, the record signals determined in step 263 through step 268 are recorded in the corresponding sectors to be recorded.

According to the above-described scheme, the signals are recorded in the optical disc in the format as shown in FIG. 10.

The random changing state of the first and second gap fields and first and second guard data recording fields is explained with reference to FIGS. 14a–d. FIGS. 14a–d depict a recording format in the sector by randomly changing the length of the first and second gap fields and first and second guard data recording fields by the above method. On the sector of optical disc are formed an address signal 401, a first gap field 402, a first guard data recording field 403, a record signal 404 composed of synchronous signal VFO and user data, a second guard data recording field 405, and a second gap field 406.

Figure 14:
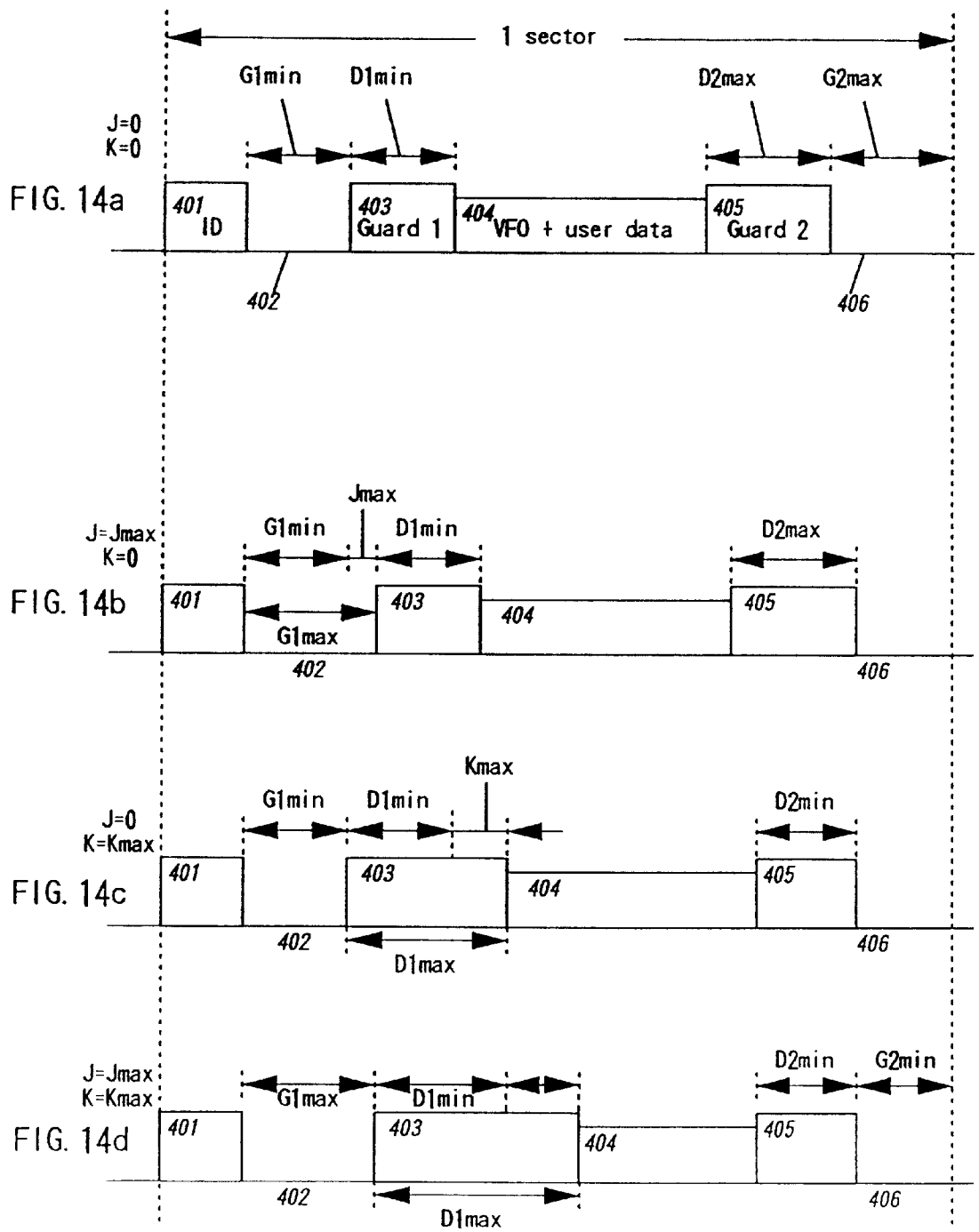
FIGS. 14a–d depict the mode of the sector when randomly changing the first and second gap fields and first and second guard data recording fields.

FIG. 14a shows a case in which the changing amount J of the first gap field 402 is the minimum J=0, and the changing amount K of the first guard data recording field 403 is the minimum K=0. Therefore, the length of the first gap field 402 is the minimum value of G1min, and the length of the second gap field 406 is the maximum value of G2max. The length of the first guard data recording field 403 is the minimum value of D1min, and the length of the second guard data recording field 405 is the maximum value of D2max. In the case shown in FIG. 14a, the record signal 404 is located at the foremost position in the sector.

In FIG. 14b, J=Jmax and K=0, in FIG. 14c, J=0, K=Kmax, and in FIG. 14d, J=Jmax, K=Kmax. Herein, Jmax is the maximum changing amount of the gap field, which is usually 15 channel bits, and Kmax is the maximum changing amount of the guard field, which is usually 7 bytes. In the case shown in FIG. 14d, the record signal 404 is located at the rearmost position in the sector. The length of the first gap field 402 is the maximum value of G1max, and the length of the second gap field 406 is the minimum value of G2min. The length of the first guard data recording field 403 is the maximum value of D1max, and the length of the second guard data recording field 405 is the minimum value of D2min.

Figure 15:
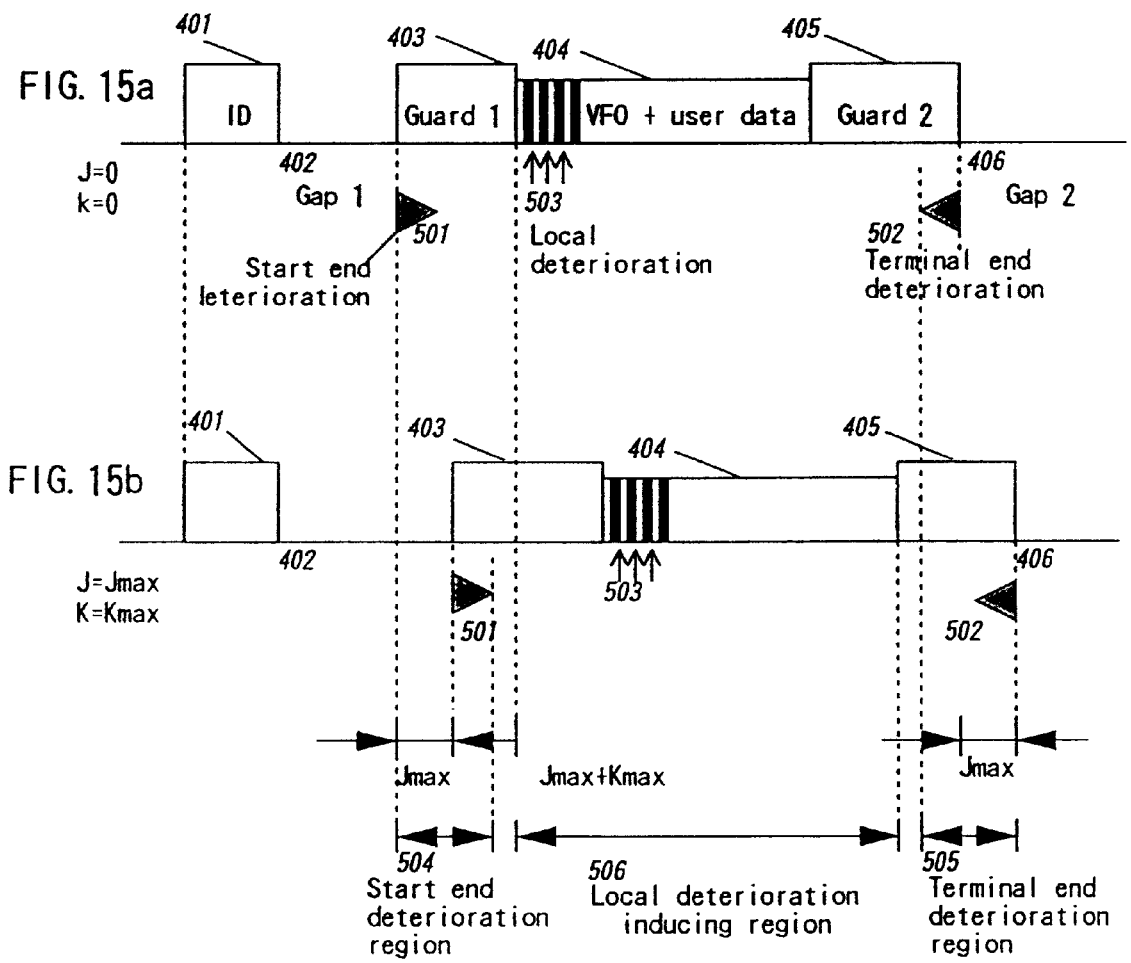
FIGS. 15a–b show the deterioration area of the sector when randomly changing the first and second gap fields and first and second guard data recording fields.

FIGS. 15a–b show schematic diagrams of deterioration of a sector. In FIG. 15a, J=0, K=0, and in FIG. 15b, J=Jmax, K=Kmax. As shown in the diagram, start end deterioration 501 occurs in the first guard data recording field 403, and a start end deterioration region 504 is formed in a total length of the maximum changing amount Jmax portions of the first and second gap fields. Similarly, terminal end deterioration 502 occurs in the second guard data recording field 405, and a terminal end deterioration region 505 is formed in a total length of the maximum changing amount Jmax portions of the first and second gap fields. However, this deterioration region is in the first and second guard data recording fields, and further expansion of the start end and terminal end deterioration regions is prevented, and hence the deterioration region does not detrimentally affect the record signal 404 composed of the synchronous signal VFO and user data.

Incidentally, in the record signal 404 composed of the synchronous signal VFO and user data, since the recording interval is randomly changed and expanded at the resolution of one byte, the range 506 for inducing local oscillation is expanded, and the local deterioration 503 is dispersed, so that the effects of local deterioration may be decreased.

In actual recording operation, J is a channel bit, and one byte is composed of 16 channel bits, and K is a larger value as compared with J. Therefore, the positions of the first and second gap fields change randomly and minutely, while the recording position changes rather widely in the record signal 404 enclosed by the first and second guard data recording fields.

In this embodiment, J is set in channel bit unit, and K in byte unit, to satisfy the following requirements. That is, the random shift of the first and second gap fields is small in scale so as not to expand the deterioration region at the recording start and terminal end, and random shift of channel bit in the minimum unit for handling digital data is realized, whereas local deterioration is dispersed by increasing the changing amount of the recording fields of the synchronous signal and user data record signal, and the arrangement of information is simple.

The first and second guard data recording fields are intended to prevent the deterioration phenomenon occurring at the start and terminal end due to repeated recording from propagating to the record signals such as synchronous signal VFO and user data. Therefore, from the viewpoint of preventing expansion of the deterioration region, the random shift should not be increased too much.

The local deterioration in record signals such as synchronous signal VFO and user data should be preferably dispersed by expanding the inducting region by changing in byte unit, thereby lowering the possible rate of effects due to deterioration.

Usually, when handling digital data, it is preferred to handle the data in byte units. However, if the random shift is handled in the byte unit alone, deviation occurs in byte unit, and deterioration in byte unit is likely to occur, and therefore as compared with the random shift in channel bit unit, the deterioration preventive effect of the medium is decreased. On the other hand, if random shift is always handled in channel bit unit only a fractional shift of 5 bits or 9 bits occurs, and signal processing is difficult in reproduction.

In this embodiment, accordingly, the random shift in the first and second gap fields in no-signal interval is in channel bit unit, so that deterioration in byte unit can be prevented, and effects of deterioration in byte unit can be prevented, and effects of deterioration at start and terminal end of a sector can be effectively suppressed. In the record signals of synchronous signal VFO and user data, if the random shift is handled in byte unit, the region to be recorded is expanded, and hence deterioration in mark unit can be dispersed, and, moreover, the data to be reproduced can be handled in byte unit, so that no inconvenience is caused in signal processing in reproduction.

As a result, the recording position of record signal 404 of synchronous signal VFO or user data as seen from the entire sector is changed over in two stages of random shift, that is, large random shift and small random shift, in every recording. In the embodiment, for two types of deterioration, that is, deterioration at start and terminal end of a sector and local deterioration occurring in every mark, effects of these deteriorations on recording and reproducing of information can be effectively decreased.

Figure 16:
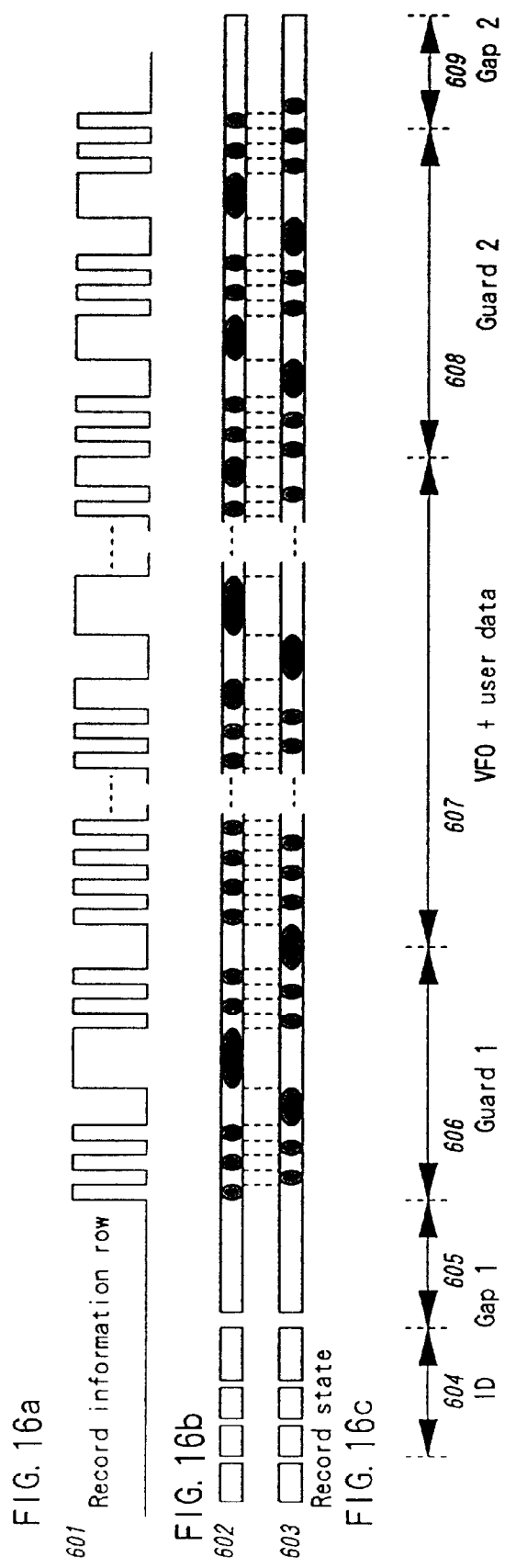
FIGS. 16a–c are diagrams for explaining the polarity of recording signal and the recording stage on an actual optical disc.

Further according to the present embodiment, the polarity of the record signal is inverted randomly in every recording. FIGS. 16a–c shows the relation between the polarity of the record signal and the actual recording state on an optical disc. In the sector of the optical disc are formed an address signal 604, a first gap field 605, a first guard data recording field 601, a record signal 607 composed of synchronous signal VFO and user data, a second guard data recording field 608, and a second gap field 609.

The record signal 601, if not inverted in polarity, is recorded in the recording medium in a state of 602, and if inverted in polarity, is recorded in the recording medium in a state of 603. That is, by inverting the polarity, the non-fused portion and the fused portion of the foil forming a mark are completely opposite, so that a further effect is added to prevention of deterioration.

Figure 17:
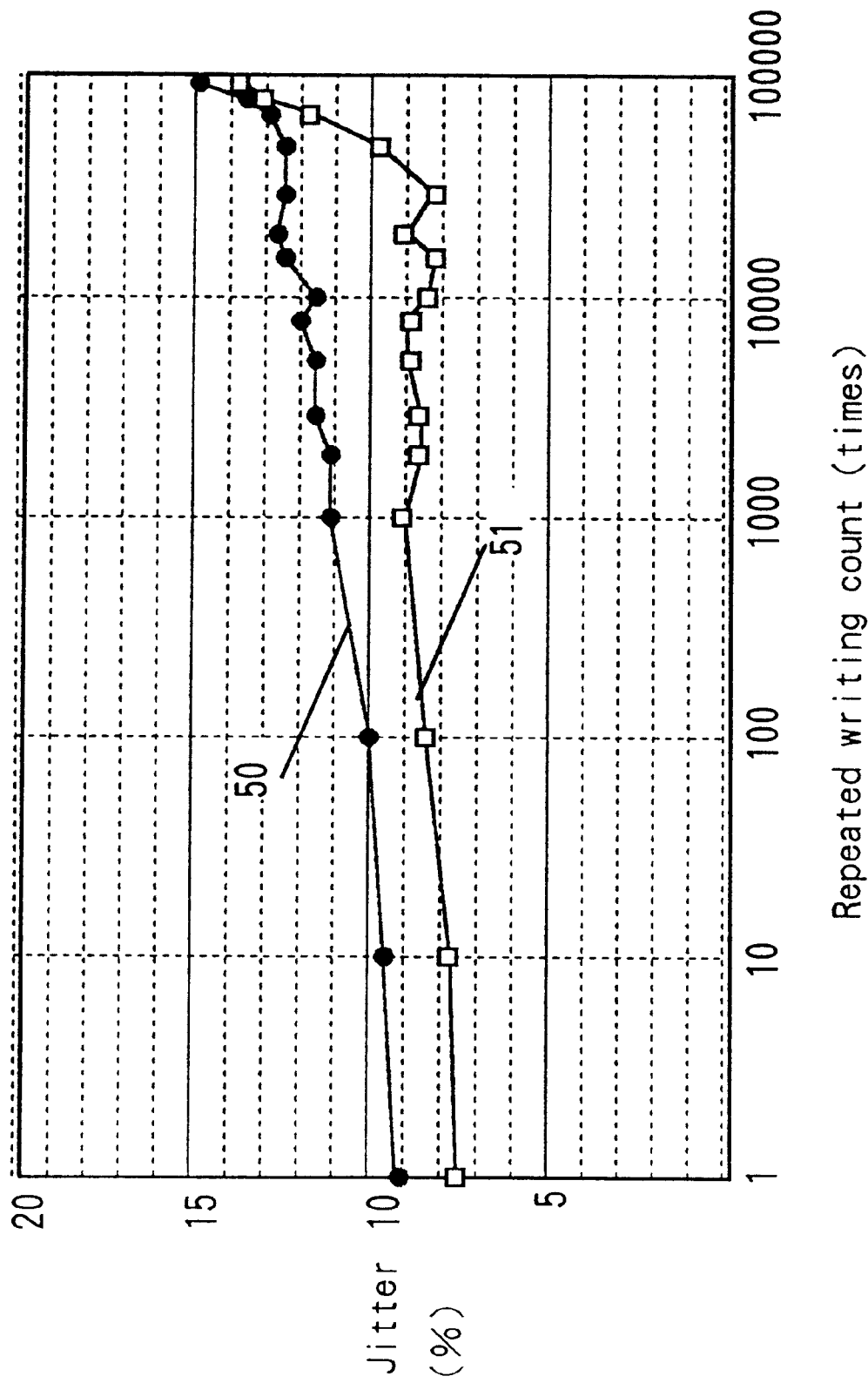
FIG. 17 is a graph of results of an experiment showing the effect of random shift according to the invention.

FIG. 17 is a diagram showing the result of an experiment confirming the effect of random shift of the invention. In this experiment, after repeatedly recording the same data signals in the sector of the optical disc, the jitter values are shown. After recording repeatedly 100,000 times, on the basis of the guideline of error probability of less than once in 10,000 times at the time of demodulation, the jitter value of 15% or less is regarded as the standard of data reproduction.

In curve 50, the maximum changing amount of the first gap field is Jmax=15 channel bits, and the maximum changing amount of the first guard data recording field is Kmax=7 bytes, and in curve 51, the maximum changing amount of the first gap field is Jmax=15 channel bits, and the maximum changing amount of the first guard data recording field is Kmax=7 bytes, and polarity inversion is included.

As can be seen from curves 50 and 51, the desired conditions can be satisfied by the maximum changing amount of the first gap field of Jmax=15 channel bits, maximum changing amount of the first guard data recording field of Kmax=7 bytes, and inclusion of polarity inversion. From the viewpoint of disc capacity, it is desired that the changing amounts of the first gap field and first guard data recording field be as small as possible, and hence it is judged that the combination of maximum changing amount of the fist gap field of Jmax=15 channel bits, maximum changing amount of the first guard data recording field of Kmax=7 bytes, and polarity inversion is preferred.

In the stage of the present experiment, incidentally, the random shift was Jmax=15 channel bits and Kmax=7 bytes, but, in the future, along with the technical progress such as development of high performance recording thin film material, it is believed that the error probability rate may be lower than once in 10,000 times in demodulation after 100,000 times of repeated recording even at a smaller shift width. In such a case, too, according to the invention, as in this embodiment, it is possible to suppress the effects of the deterioration phenomenon on the accurate recording and reproducing of information at a certain limited random shift amount.

Thus, according to the present embodiment, by randomly changing the length of the first gap field and first guard field in every recording, and by inverting the polarity of record signal in every recording, at the maximum changing amount of the first gap field of Jmax=15 channel bits, maximum changing amount of the first guard data recording field of Kmax=7 bytes, signal processing is facilitated in a limited random shift amount, and effects of the two types of deterioration phenomenon in every sector and in every mark on the accurate recording and reproducing of information can be suppressed.

In the present embodiment, by setting the recording pattern of guard data in the first guard data recording field to the same recording pattern in the synchronous signal field, and keeping continuous the phase of the record signal between the first guard data recording field and synchronous signal interval, the synchronous signal interval is expanded, and system stability can be enhanced.

Moreover, in the optical disc device using the reproduced light output and at least one type or more of recorded light output, regardless of the type of the recording medium, evidently, the invention can be applied not only in the phase change optical disc, but also in magneto-optical discs and others.

What is claimed is:

1. An optical disc having a plurality of sectors, each one of said sectors, sequentially comprising: a first gap field with a no-signal interval, a first guard data recording field for recording guard data, a data recording field containing a synchronous signal and following user data, a second guard data recording field for recording the guard data, and a second gap field with a no-signal interval, the total length of said first and second gap fields being constant, the total length of said first and second guard data recording fields being constant, the length of said first and second gap fields and the length of said first and second guard data recording fields being randomly changeable in every recording, and the changing amount of said first and second gap fields being smaller than the changing amount of said first and second guard data recording fields, wherein the guard data in said first and second guard data recording fields is the same as the recording pattern of the synchronous signal.

2. An optical disc device, operative on an optical disc having a plurality of sectors divided from a track, comprising:

guard data generating means for generating guard data in first and second guard data recording fields;

synchronous signal generating means for generating a synchronous signal;

random changing means for (i) randomly changing the length of first and second gap fields with a no-signal interval in every recording, the total length of said first and second gap fields being constant, (ii) randomly changing the length of first and second guard data recording fields in every recording, the total length of said first and second guard data recording fields being constant, and (iii) controlling the change amount of said first and second gap fields to be smaller than the changing amount of said first and second guard data recording fields; and record controlling means for (i) forming each sector comprising sequentially a first gap field with a no-signal interval, a first guard data recording field for recording guard data, a data recording field containing a synchronous signal and following user data, a second guard data recording field for recording guard data, and a second gap field with a no-signal interval, and for (ii) recording signals in said first and second guard data recording fields and said data recording fields, on the basis of the changing amount of said first and second gap fields and the changing amount of said first and second guard data recording fields, wherein the guard data in said first and second guard data recording fields is the same as the recording pattern of the synchronous signal.

3. A recording method for an optical disc having a plurality of sectors divided from a track, the method comprising the steps of:

forming a sector structure comprised sequentially of a first gap field with a no-signal interval, a first guard data recording field for recording guard data, a data recording field containing a synchronous signal and following user data, a second guard data recording field for recording the guard data, and a second gap field with a no-signal interval;

setting the guard data in said first and second guard data recording fields to be the same as the recording pattern of the synchronous signal;

setting the total length of said first and second gap fields constant, setting the total length of said first and second guard data recording fields constant, when recording, randomly changing the lengths of said first and second gap fields and randomly changing the lengths of said first and second guard data recording fields in every recording and controlling the change amount of said first and second gap fields to be smaller than the changing amount of said first and second guard data recording fields.

* * * * *